(12) United States Patent
Shulyak et al.

(10) Patent No.: US 11,775,440 B2
(45) Date of Patent: Oct. 3, 2023

(54) PRODUCER PREFETCH FILTER

(71) Applicant: Arm Limited, Cambridge (GB)

(72) Inventors: Alexander Cole Shulyak, Austin, TX (US); Balaji Vijayan, Austin, TX (US); Karthik Sundaram, Austin, TX (US); Yasuo Ishii, Austin, TX (US); Joseph Michael Pusdesris, Austin, TX (US)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 17/579,842

(22) Filed: Jan. 20, 2022

(65) Prior Publication Data

US 2023/0229596 A1    Jul. 20, 2023

(51) Int. Cl.
  *G06F 12/0862*    (2016.01)
(52) U.S. Cl.
  CPC .. *G06F 12/0862* (2013.01); *G06F 2212/1024* (2013.01); *G06F 2212/602* (2013.01)
(58) Field of Classification Search
  CPC ......... G06F 12/0862; G06F 2212/1024; G06F 2212/602
  See application file for complete search history.

(56) References Cited

U.S. PATENT DOCUMENTS

| | | | | |
|---|---|---|---|---|
| 6,275,918 B1* | 8/2001 | Burky | ............... | G06F 9/3455 712/225 |
| 6,721,870 B1* | 4/2004 | Yochai | ............... | G06F 3/0689 711/204 |
| 8,196,147 B1* | 6/2012 | Srinivasan | ............ | H04L 67/568 719/310 |
| 2006/0026408 A1 | 2/2006 | Morris | | |
| 2007/0088919 A1* | 4/2007 | Shen | .................. | G06F 12/0815 711/E12.057 |
| 2010/0241813 A1* | 9/2010 | Shen | ..................... | G06F 9/544 711/144 |
| 2017/0168946 A1 | 6/2017 | Wang | | |
| 2017/0344483 A1* | 11/2017 | Shwartsman | ....... | G06F 12/0862 |
| 2020/0387381 A1* | 12/2020 | Karve | .................... | G06F 9/383 |

OTHER PUBLICATIONS

U.S. Appl. No. 17/093,792, filed Nov. 10, 2020, Shulyak et al.

(Continued)

*Primary Examiner* — Prasith Thammavong
(74) *Attorney, Agent, or Firm* — NIXON & VANDERHYE P.C.

(57) ABSTRACT

Indirect prefetch circuitry initiates a producer prefetch requesting return of producer data having a producer address and at least one consumer prefetch to request prefetching of consumer data having a consumer address derived from the producer data. A producer prefetch filter table stores producer filter entries indicative of previous producer addresses of previous producer prefetches. Initiation of a requested producer prefetch for producer data having a requested producer address is suppressed when a lookup of the producer prefetch filter table determines that the requested producer address hits against a producer filter entry of the table. The lookup of the producer prefetch filter table for the requested producer address depends on a subset of bits of the requested producer address including at least one bit which distinguishes different chunks of data within a same cache line.

18 Claims, 16 Drawing Sheets

(56) References Cited

OTHER PUBLICATIONS

U.S. Appl. No. 17/545,121, filed Dec. 8, 2021, Shulyak et al.
A. Roth et al., "Dependence Based Prefetching for Linked Data Structures," Oct. 1998, pp. 115-126.
X. Yu et al., "IMP: Indirect Memory Prefetcher", Proceedings of the 48th International Symposium on Microarchitecture—Micro 48, Dec. 5-9, 2015, 14 pages.
Notice of Allowance dated May 12, 2022 for U.S. Appl. No. 17/093,792, 15 pages.
Office Action dated Jul. 18, 2023 for U.S. Appl. No. 17/545,121, 26 pages.

\* cited by examiner

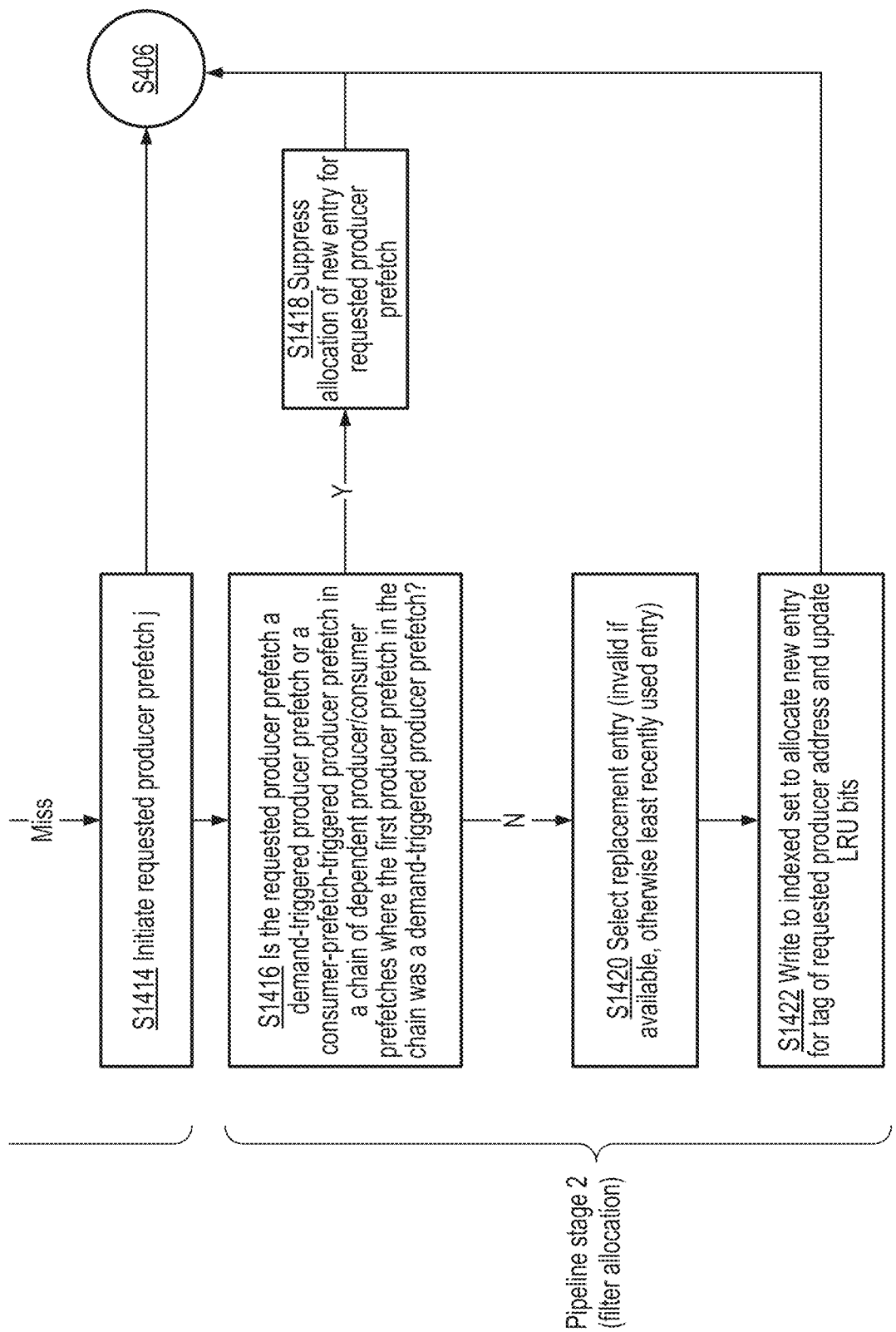

PRODUCER PREFETCH FILTER

BACKGROUND

Technical Field

The present technique relates to the field of prefetching.

Technical Background

Prefetching is a technique used by a data processing apparatus to mitigate against the latency associated with memory access, by initiating the retrieval of data values or instructions from memory before the data processing apparatus encounters the corresponding instructions to fetch those data values or instructions. In some cases prefetching is more straightforward, for example when an address from which a data value is to be loaded is directly specified in a corresponding instruction, since this will generally result in a more regular pattern of accesses, because each time this instruction is encountered the load comes from the same address. However prefetching becomes more difficult when a load instruction is a "consumer load", where the address from which a data value is to be loaded is indirectly specified, being based on a data value returned in an earlier "producer load". Variability in that data value thus results in variability in the address which the consumer load accesses and thus a more variability in the pattern of accesses. Accordingly, such producer-consumer load relationships can result in an irregular and non-repeating access pattern, making it more difficult to identify and schedule prefetches.

SUMMARY

At least some examples of the present technique provide an apparatus comprising:

indirect prefetch circuitry to prefetch data to a cache, wherein the indirect prefetch circuitry is configured to initiate a producer prefetch to request return of producer data having a producer address and to initiate at least one consumer prefetch to request prefetching of consumer data to the cache, the consumer data having a consumer address derived from the producer data returned in response to the producer prefetch;

a producer prefetch filter table to store producer filter entries indicative of previous producer addresses of previous producer prefetches previously initiated by the indirect prefetch circuitry; and producer prefetch filtering circuitry to suppress initiation of a requested producer prefetch requested to be initiated by the indirect prefetch circuitry for producer data having a requested producer address, in response to determining in a lookup of the producer prefetch filter table that the requested producer address hits against one of the producer filter entries of the producer prefetch filter table, in which:

the lookup of the producer prefetch filter table for the requested producer address depends on a subset of bits of the requested producer address including at least one bit which distinguishes different chunks of data within a same cache line.

At least some examples of the present technique provide a method comprising:

requesting initiation of a requested producer prefetch to request return of producer data having a requested producer address, using indirect prefetch circuitry configured to initiate at least one consumer prefetch to request prefetching of consumer data to a cache, the consumer data having a consumer address derived from the producer data returned in response to the producer prefetch;

performing a lookup of requested producer address in a producer prefetch filter table storing producer filter entries indicative of previous producer addresses of previous producer prefetches previously initiated by indirect prefetch circuitry, to determine whether the requested producer address hits or misses in the producer prefetch filter table; and suppressing initiation of the requested producer prefetch in response to determining that the requested producer address hits in the producer prefetch filter table; in which:

the lookup of the producer prefetch filter table for the requested producer address depends on a subset of bits of the requested producer address including at least one bit which distinguishes different chunks of data within a same cache line.

At least some examples of the present technique provide a non-transitory computer-readable medium to store computer-readable code for fabrication of an apparatus comprising:

indirect prefetch circuitry to prefetch data to a cache, wherein the indirect prefetch circuitry is configured to initiate a producer prefetch to request return of producer data having a producer address and to initiate at least one consumer prefetch to request prefetching of consumer data to the cache, the consumer data having a consumer address derived from the producer data returned in response to the producer prefetch;

a producer prefetch filter table to store producer filter entries indicative of previous producer addresses of previous producer prefetches previously initiated by the indirect prefetch circuitry; and producer prefetch filtering circuitry to suppress initiation of a requested producer prefetch requested to be initiated by the indirect prefetch circuitry for producer data having a requested producer address, in response to determining in a lookup of the producer prefetch filter table that the requested producer address hits against one of the producer filter entries of the producer prefetch filter table, in which:

the lookup of the producer prefetch filter table for the requested producer address depends on a subset of bits of the requested producer address including at least one bit which distinguishes different chunks of data within a same cache line Further aspects, features and advantages of the present technique will be apparent from the following description of examples, which is to be read in conjunction with the accompanying drawings.

DESCRIPTION OF EXAMPLES

Producer Prefetch Filtering

Figure 1:
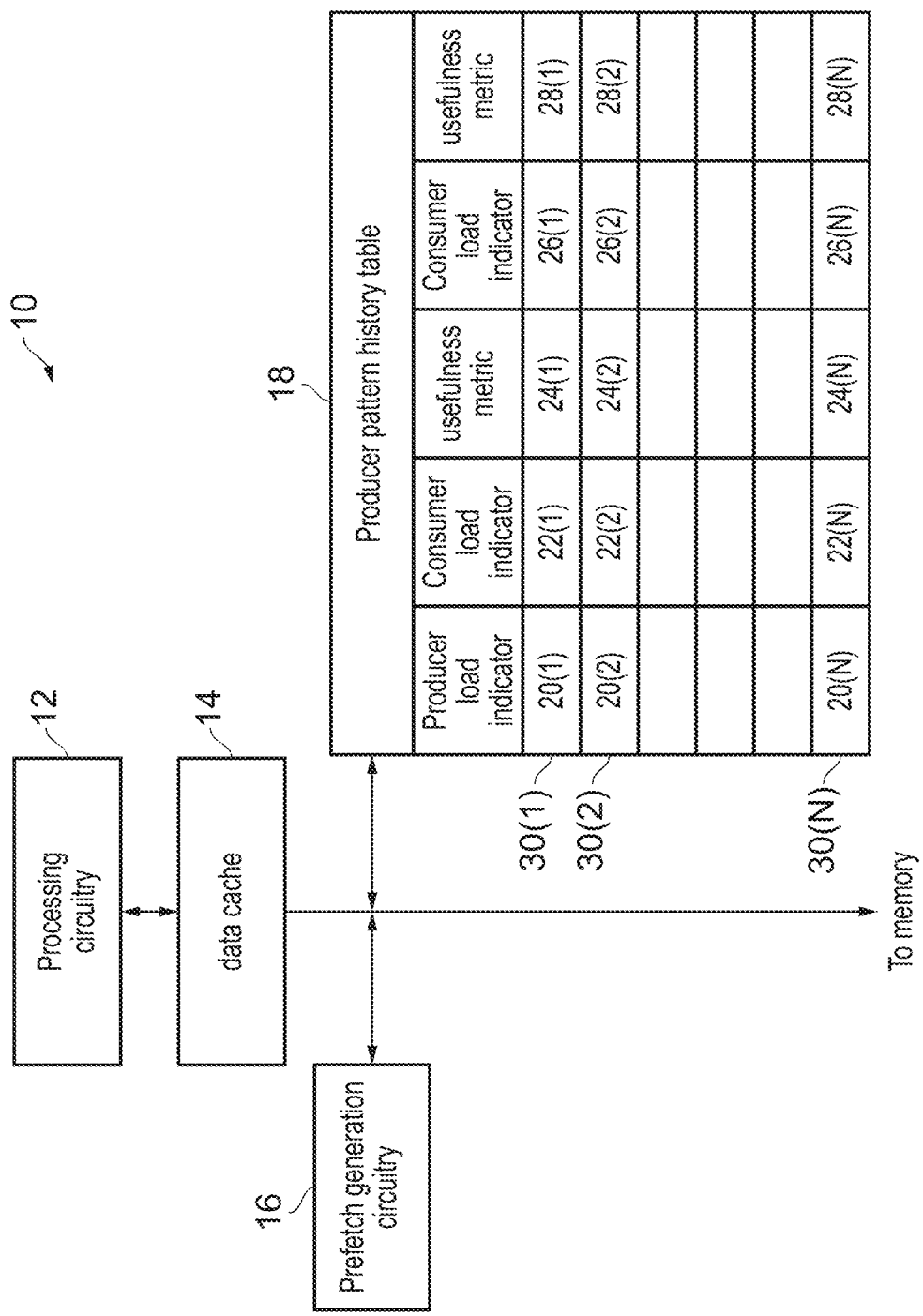
FIG. 1 schematically illustrates details of a data processing apparatus.

A processing apparatus may have indirect prefetch circuitry to prefetch data to a cache. The indirect prefetch circuitry can initiate a producer prefetch to request return of producer data having a producer address and initiate at least one consumer prefetch to request prefetching of consumer data to the cache, where the consumer data has a consumer address derived from the producer data returned in response to the producer prefetch. This can be useful for improving cache hit rates when processing program code which uses a pointer loaded by a producer load to form addresses for one or more consumer loads.

The indirect prefetch circuitry may trigger a producer prefetch in response to a number of events, and it is possible that events redundantly triggering the same producer prefetch may occur (and therefore any consumer prefetches depending on that producer prefetch may unnecessarily be initiated multiple times). In some examples, a consumer prefetch may itself serve as a further producer prefetch triggering a further set of consumer prefetches in a chain of dependent producer/consumer prefetches. Hence, a redundantly initiated producer prefetch can waste cache/memory bandwidth as well as resource within the prefetcher itself (such as slots in queues for queuing prefetch requests to be initiated or queuing returned producer data). This can reduce performance (as other prefetch requests for prefetching more useful data may not be able to be processed given bandwidth limitations, and so cache hit rate may be reduced) and waste energy.

In examples discussed below, a producer prefetch filter table is provided to store producer filter entries indicative of previous producer addresses of previous producer prefetches previously initiated by the indirect prefetch circuitry. Producer prefetch filtering circuitry suppresses initiation of a requested producer prefetch requested to be initiated by the indirect prefetch circuitry for producer data having a requested producer address, in response to determining, in a lookup of the producer prefetch filter table performed for the requested producer address, that the requested producer address hits against one of the producer filter entries of the producer prefetch filter table. The lookup of the producer prefetch filter table for the requested producer address depends on a subset of bits of the requested producer address including at least one bit which distinguishes different chunks of data within a same cache line.

With this approach, the producer prefetch filter table can track addresses of previously initiated producer prefetches and use this to filter out redundant producer prefetches to reduce the likelihood of wasted bandwidth caused by redundantly processing the same producer prefetch and any dependent consumer prefetches more than once.

Unusually, the granularity of address tracking used for the lookup scheme for looking up the producer prefetch filter table is at a granularity of chunks of data smaller than a cache line size. A cache line is a unit of data brought into the cache in a single transfer. Hence, when data is prefetched to the cache, even if only a portion of a cache line is expected to be used by a future load, the prefetch would normally cause the entire cache line of data to be brought into the cache. Hence, a skilled person in the field of prefetching would normally think that once a prefetch request has been processed regarding a particular address, it would be redundant to process another prefetch request specifying an address mapping to a different chunk of data within the same cache line as the previous prefetch request. Therefore, one would expect that the granularity of address tracking used by the lookup scheme for the producer prefetch filter table should be in units of the cache line size, so that an address would hit against a given filter entry when it relates the same cache line as the address represented by the given filter entry, even if the addresses relate to different chunks within the same cache line. It would be counterintuitive to track prefetch addresses at a finer granularity relating to different chunks within the same cache line as described above for the producer prefetch filtering circuitry. Therefore, normally the sub-cache line bits of the requested producer address, which distinguish different chunks of data within the same cache line, would be ignored for the lookup of a prefetch filter, with the lookup only depending on more significant bits which distinguish addresses in different cache lines.

In contrast, the inventors have recognised that, for the indirect prefetch circuitry, where a producer prefetch is requesting that producer data is returned to the indirect prefetch circuitry so that it can be used by the indirect prefetch circuitry to generate the addresses for one or more consumer prefetches, two producer prefetches which specify addresses mapping to different chunks of data within the same cache line would not be considered redundant as the two producer prefetches return different data values which can serve to construct addresses for different sets of dependent consumer prefetches. By providing a lookup scheme for the producer prefetch filter table which depends on at least one bit distinguishing different chunks of data within the same cache line, this can more effectively filter out the redundant producer prefetches while ensuring that useful producer prefetches targeting addresses mapping to different chunks of data within the same cache line can still be initiated.

The producer prefetch filtering circuitry may determine that the requested producer address hits against a given producer filter entry allocated in response to a given previous producer prefetch specifying a given previous producer address, when the requested producer address and the given previous producer address correspond to a same chunk of data within a same cache line; and determine that the requested producer address misses against the given producer filter entry when the requested producer address and the given previous producer address correspond to different chunks of data within a same cache line. This is unusual as normally one would expect a prefetch filter to detect a hit when a looked up address corresponds to a different chunk in the same cache line as an address for which a valid prefetch filter entry was previously allocated. However, for the reasons explained earlier it can be useful to detect a miss between addresses mapping to different chunks of data in the same cache line, to allow redundant producer prefetches to be filtered out while still enabling different producer prefetches to be issued to request the different chunks of data within the same cache line that can serve to construct different consumer prefetches.

Often, the producer prefetch filtering circuitry may also determine that the requested producer address misses against the given producer filter entry when the requested producer address and the given previous producer address correspond to different cache lines. It can be useful to detect a miss in this case to avoid useful prefetches being unnecessarily suppressed.

However, detecting a miss when the requested producer address and given previous producer address correspond to different cache lines is not essential in all circumstances. For example, some implementations may use a lookup scheme which uses a hashing scheme to reduce the number of bits in the index used to select which entries to read in the producer prefetch filter table and/or the number of bits in a tag value to be compared when looking up the producer prefetch filter table, and this may sometimes cause (relatively rare) false hits when a hit is detected indicating that the requested producer address corresponds with a previous producer address for which a producer filter entry was previously allocated, even though the requested producer address actually corresponds to a different cache line to the given previous producer address. As false hits are not a problem from a functional correctness point of view (as whether a prefetch is generated or supressed is merely a matter of performance), the lookup scheme has freedom to trade off performance against number of stored bits and complexity of circuit logic, depending on the balance sought by the designer of a particular system. Therefore, there could be some occasions when a hit may be detected for the given producer filter entry even though the requested producer address corresponds to a different cache line to the given previous producer address.

The producer filter entries can be implemented in different ways. For example, one approach could be to maintain a bitmap with each entry comprising one bit of the bitmap and each entry corresponding to an address of a given chunk of data of size less than one cache line. In this case, a "hit" can be a lookup to the corresponding bit for a given address which detects that the bit is set to indicate that address as previously having been processed in a prefetch request and a "miss" can be a lookup which detects the bit as not set.

However, in practice the number of bits required to cover the address space may be large. A more efficient implementation may use a cache-like structure which has entries for a subset of addresses which can be replaced when necessary to track a certain recently encountered subset of addresses of chunks of data of size less than one cache line. The replacement of cache entries in the filter table can also be useful for causing old entries to be discarded over time as the likelihood that the redundantly prefetched data is still in the cache reduces. Hence, each entry may store a tag value, which can be compared with a tag value derived from the requested producer address to identify on a lookup whether a looked up address hits against the corresponding filter table entry.

In some examples the tag value may simply specify the corresponding previous producer address directly. Alternatively, the tag value may have fewer bits than the previous producer address itself, with the tag value corresponding to either a portion of bits of the previous producer address, a hash of the previous producer address, or a hash of a portion of bits of the previous producer address. If a set-associative structure is used for the producer prefetch filter table, then when looking up the table, the producer prefetch filtering circuitry may determine an index value based on the requested producer address, and select a set of producer filter entries to look up based on the index value. In this case, the tag value only needs to distinguish between addresses which map onto the same index value, so can be based on a reduced subset of bits. Also, it is not essential that the tag value (or combination of index value used for lookup and the tag value) uniquely identifies any particular address. To reduce the storage overhead, a hash value which has a number of bits insufficient to uniquely distinguish each address could be used as the index/tag value pair, as the penalty for an incorrectly issued prefetch or an incorrectly suppressed prefetch may simply be a little loss of performance and energy efficiency, and overall the storage overhead required to uniquely distinguish each address may not be justified when considering the energy and circuit area cost of storing extra bits. Hence, some implementations may use a hash which permits some aliasing, so that there is the potential for a hit to be detected for a given producer filter entry allocated to represent a given previous producer address even if the requested producer address and the given previous producer address do not correspond to the same chunk of data within the same cache line.

Hence, while on most lookups it may be expected that if the requested producer address and the given previous producer address correspond to different cache lines, a miss is detected for the given producer filter entry, this does not always need to be the case and on rare occasions aliasing may cause a hits to be detected in this scenario. In practice, the hashing scheme used to generate the index/tag values may be selected so that the aliasing addresses which map to the same combination of index value and tag value may be far apart in the address space, and so given locality of memory accesses it is relatively unlikely that a given section of code would simultaneously be processing more than one of the aliasing addresses at the time, to reduce the likelihood that a prefetch is incorrectly suppressed or initiated.

In some examples, the producer prefetch filtering circuitry determines, based on at least one bit of the requested producer address which distinguishes different chunks of data within the same cache line, an index value used by the producer prefetch filtering circuitry to select one or more producer filter entries to be looked up in the lookup of the producer prefetch filter table for the requested producer address.

In some examples, the producer prefetch filtering circuitry determines, based on said at least one bit of the requested producer address which distinguishes different chunks of data within the same cache line, a tag value to be compared with a tag value stored in one or more producer filter entries to be looked up in the lookup of the producer prefetch filter table for the requested producer address.

Hence, one or more sub-cache-line bits of the requested producer address which distinguish different chunks of data within a same cache line can be used to form either the index value, or the tag value, or both, when looking up the producer prefetch filter table. The index value and tag value may also depend on one or more bits of the requested producer address which are more significant than the sub-cache-line bits.

The different chunks of data within the same cache line comprise chunks of a given chunk size smaller than a cache line size. In some examples, the given chunk size is equal to, or smaller than, an address size specified by an instruction set architecture (ISA) supported by the apparatus. This address size refers to the architectural address size defined by the ISA (for example, an ISA may be a 32-bit or 64-bit architecture, indicating that the architectural address size is 32 bits or 64 bits respectively). This does not necessarily mean that storage elements provided in hardware for storing addresses need to store the full number of bits defined by the architectural address size. For example, while an architecture may support 64-bit addresses, a particular processor implementation may only require a memory address space of a size requiring a smaller number of bits than the full architectural address size (e.g. 48 bits may be enough to distinguish each memory location within the implemented memory address space), and so a particular microarchitecture could choose to store fewer bits than the architectural address size.

As the producer data to be returned by producer prefetches is to be used to form a consumer address to be used for a consumer prefetch, it may be expected that the maximum data size to be returned in response to a producer prefetch is the architectural address size, and so it can be useful for the granularity of address tracking for the producer prefetch filter table to operate based on chunks of data no larger than the address size specified by the instruction set architecture of the apparatus. However, some implementations may have the producer prefetch filter table lookup operate at granularity of chunks of data smaller than the address size. For example, if the indirect prefetch circuitry forms the consumer address by treating the producer data as an offset to be added to a separately specified base address, the producer data may be smaller than the address size and so such prefetchers may have the chunk size smaller than the address size. Other implementations may form the consumer address by treating the producer data as a base address from which consumer addresses are offset, and in this case the producer data may be assumed to have the address size and so the chunk size may be set correspondingly to the address size.

In one particular example, the chunk size may be 8 bytes, which can be useful for an implementation where the ISA is a 64-bit architecture. However, other chunk sizes are also possible. The chunk size is smaller than a cache line size which may be 32, 64 or 128 bytes, for example.

In some examples, the apparatus may have a producer pattern history table to store a plurality of producer-consumer relationships, each producer-consumer relationship defining a producer load indicator and at least one consumer load indicator. In response to detecting a producer load corresponding to the producer load indicator of a given producer-consumer relationship indicated in the producer pattern history table, the indirect prefetch circuitry requests initiation of a producer prefetch corresponding to the producer load indicator and at least one consumer prefetch corresponding to the at least one consumer load indicator of the given producer-consumer relationship. Hence, the producer pattern history table indicates which consumer prefetches are to be triggered when the producer load is detected, based on the producer data returned by a producer prefetch which requests that the producer data is returned to the indirect prefetch circuitry (the producer prefetch could hit in a cache entry already allocated, or could itself trigger prefetching of the producer data into the cache as well as the return of the producer data to the indirect prefetch circuitry for use in constructing the consumer address).

In some examples, in response to detecting that a consumer prefetch corresponds to the producer load indicator of a further producer-consumer relationship indicated in the producer pattern history table, the indirect prefetch circuitry may request initiation of a further producer prefetch and at least one further consumer prefetch corresponding to the producer load indicator and the at least one consumer load indicator defined in the further producer-consumer relationship. A further consumer prefetch may then itself serve as a further producer prefetch, and so there can be a recursive chain of dependent producer and consumer prefetches. This can be one reason why the cost of redundantly processing a producer prefetch may be significant as it is not only the producer prefetch itself but also any dependent producer and consumer prefetches which may end up being redundantly performed.

The producer load which triggers the producer prefetch to be initiated may be one of several types of loads. For example, the producer load can be one of:
 a demand-triggered load requesting loading of data to registers of processing circuitry;
 a prefetch request issued by further prefetch circuitry to prefetch data to the cache according to a prefetching scheme different from a prefetching scheme used by the indirect prefetch circuitry; and
 a consumer prefetch issued by the indirect prefetch circuitry which corresponds to the producer load indicator of a further producer-consumer relationship stored in the pattern history table.

Hence, there can be a number of sources of producer loads which may trigger a producer prefetch, and this is another reason why the same producer prefetch may redundantly be processed multiple times. For example, the further prefetch circuitry may already have predicted that a given address will be required by a demand-triggered load, and so the prefetch request issued by the further prefetch circuitry may trigger a given producer prefetch to be processed by the indirect prefetch circuitry, but then when the demand loads load from the address of data already prefetched by the prefetch request issued by the further prefetch circuitry, the corresponding demand-triggered load may again cause the indirect prefetch circuitry to initiate the same producer prefetch. If the relation between different consumer prefetches issued by the indirect prefetch circuitry can itself be predicted by the further prefetch circuitry then again this may result in multiple producer loads to the same address being detected and then triggering the same producer prefetch request to be requested for initiation by the indirect prefetch circuitry. Hence, in implementations which trigger producer prefetches based on a number of different types of producer loads, the producer prefetch filtering circuitry and filter table can be particularly useful.

The producer prefetch filter table can be looked up by the producer prefetch filtering circuitry each time a producer prefetch is requested to be initiated by the indirect prefetch circuitry. If the requested producer prefetch hits in the table then it can be suppressed from being initiated, while if it misses then it can be allowed to be initiated.

On a miss in the producer prefetch filter table, the producer prefetch filtering circuitry can also allocate to the producer prefetch filter table a new producer filter entry corresponding to the requested producer address of the requested producer prefetch which missed in the filter table. Hence, the filter table can then retain information about the address of the producer prefetch which was not filtered out using table, to allow later producer prefetches to be suppressed if they request prefetching of data for the same sub-cache-line chunk of data.

Sometimes, when the new producer filter entry is to be allocated into the table, there may not be an invalid producer filter entry spare which is able to be allocated for use as the new producer filter entry. Hence, the producer prefetch filtering circuitry may implement a replacement policy to decide which entry of the table to use for the new producer filter entry.

It can be useful for the replacement policy used by the producer prefetch filtering circuitry to be a least-recently-used (LRU) replacement policy. For example, the oldest entry (among a set of entries allowed to be selected for the particular requested producer address that missed in the table) which was least recently allocated may be selected for replacement with the new entry. In general, the likelihood of producer prefetches being redundantly requested multiple times may reduce over time (as program flow moves on from the portion of code that accessed a particular address) and so the most useful entries are likely to be those least recently allocated to the producer prefetch filter table, and so using LRU as the replacement policy will tend to improve performance.

In some implementations, when the requested producer address misses in the producer prefetch filter table, a new producer filter entry of the table may be allocated in response to the miss detected for the requested producer address, regardless of the type of producer prefetch.

However, other implementations may restrict allocations into the producer prefetch filter table to certain types of producer prefetches, so that allocation may be suppressed if the requested producer prefetch which missed in the table is one of a certain subset of types not allowed to trigger allocation into the producer prefetch filter table.

For example, the apparatus may have processing circuitry to issue demand-triggered load requests to request loading of data to registers of the processing circuitry. The producer prefetch filtering circuitry may suppress allocation of the new producer filter entry corresponding to the requested producer address when the requested producer prefetch which misses in the producer prefetch filter table is one of:
  a demand-triggered producer prefetch triggered by the indirect prefetch circuitry in response to a demand-triggered load request issued by the processing circuitry; and
  a consumer-prefetch-triggered producer prefetch triggered by a consumer prefetch initiated by the indirect prefetch circuitry in a chain of dependent producer/consumer prefetches, where a first producer prefetch in the chain of dependent producer/consumer prefetches was a demand-triggered producer prefetch.

This may seem counterintuitive because, by not allocating a new producer filter entry for the requested producer address of a demand-triggered producer prefetch or a dependent consumer-prefetch-triggered producer prefetch in a chain initiated by demand-triggered producer prefetch, this will mean that some producer prefetches may redundantly be initiated multiple times even if they specify addresses mapping to the same chunk of data within the same cache line. However, the inventors recognised that, in fact, suppressing allocations for producer prefetches deriving from a demand-triggered load can actually improve processing performance because this will tend to improve the timeliness with which prefetch requests can be initiated in a dependent chain of producer/consumer prefetches, causing increased cache hit rates for the demand loads.

For example, if the program code being executed is traversing a linked list where each node of the list provides a pointer to the next node, a first demand access to the linked list may trigger a corresponding demand-triggered producer prefetch for the data in the first node in the list, which when returned is used to construct the address of a subsequent consumer prefetch, which itself may be a producer prefetch for a further iteration of the recursive chain of dependent producer/consumer prefetches, and so on until a certain number of subsequent nodes of the list have been prefetched into the cache in response to those producer/consumer prefetches (to reduce circuit implementation overhead, there may be a restriction on the maximum depth that can be reached by such a dependent chain of producer/consumer prefetches). If the producer prefetches in this chain were all allocated to the producer filter table then as the stream of demand loads traverses the linked list each demand load would specify an address which hits in the producer filter table and so would cause the corresponding producer prefetch to be suppressed, meaning that no subsequent producer or consumer prefetches would be initiated until the demand stream has reached the first of the nodes of the list for which no earlier producer/consumer prefetches were initiated, and at this point the stream of demand loads will encounter cache misses which may cause loss of performance. In contrast, if demand-triggered producer prefetches and any dependent consumer prefetches dependent on the demand-triggered producer prefetch are prevented from being allocated into the producer filter table, then as the stream of demand loads traverses the list, subsequent producer/consumer prefetches may be initiated to allow the prefetch stream to stay a certain distance ahead of the stream of demand load so that the data of later nodes in the link list can be prefetched into the cache in a timely manner to reduce the cache miss rate.

On the other hand, the apparatus may have further prefetch circuitry to prefetch data to the cache according to a prefetching scheme different from a prefetching scheme used by the indirect prefetch circuitry. The producer prefetch filtering circuitry may allow allocation of the new producer filter entry corresponding to the requested producer address when the requested producer prefetch which misses in the producer prefetch filter table is one of:
  a producer prefetch triggered by a prefetch request issued by the further prefetch circuitry; and
  a consumer-prefetch-triggered producer prefetch triggered by a consumer prefetch initiated by the indirect prefetch circuitry in a chain of dependent producer/consumer prefetches, where a first producer prefetch in the chain of dependent prefetches was triggered by a prefetch request issued by the further prefetch circuitry.

In practice, many of the redundant producer prefetches may be triggered by prefetch requests issued by the further prefetch circuitry or by further consumer prefetches dependent on such prefetch requests issued by the further prefetch circuitry, and so by allocating new producer filter table entries in response to these types of requested producer prefetch, this can be enough to greatly reduce the number of redundant producer prefetches that are processed, to save cache/memory bandwidth and resource at the prefetcher, and hence improve performance and energy efficiency.

Hence, overall the balance in terms of performance and energy efficiency may be improved by allocating to the producer prefetch filter table a new entry corresponding to an address of a producer prefetch triggered by a prefetch request issued by the further prefetch circuitry or one of its dependent consumer prefetch-triggered producer prefetches, but not allocating a new entry for an address of a demand-triggered producer prefetch or one of its dependent consumer prefetch-triggered producer prefetches.

In some examples the further prefetch circuitry mentioned above can comprise stride prefetch circuitry to predict addresses of data to be prefetched based on a stride offset observed between addresses of loads.

The producer prefetch filtering circuitry may comprise a first pipeline stage to perform lookup in the producer prefetch filter table and a second pipeline stage to perform allocation into the producer prefetch filter table. The first pipeline stage may perform the lookup for a first requested producer address of a first requested producer prefetch in a same cycle as the second pipeline stage performs the allocation of the new producer filter entry corresponding to a second requested producer address of a second requested producer prefetch. This pipelining can improve performance because it means that the overall latency per requested producer prefetch is reduced to the period of one cycle rather than the two cycles taken to perform both the lookup and the allocation.

In some cycles, a read/write conflict may arise, indicative of a first producer filter entry corresponding to the first requested producer address being incapable of being read by the first pipeline stage in a same cycle as a second producer filter entry corresponding to the second producer filter entry is written in the second pipeline stage. For example, the read/write conflict may be a bank conflict, where (when the producer prefetch filter table comprises two or more banks of storage circuitry), the producer prefetch filtering circuitry detects the read/write conflict when the first producer filter entry and the second producer filter entry are entries in the same bank of storage circuitry. This may occur because the number of read/write ports may be insufficient to support simultaneous reading/writing to entries in the same bank of storage circuitry in the same cycle (and it may not be considered justified to add more read/write ports).

In some examples, in response to detecting the read/write conflict in a given cycle, the producer prefetch filtering circuitry may suppress the lookup for the first requested producer address and allow the first requested producer prefetch to be initiated regardless of whether the first requested producer address would have hit in the producer prefetch filter table if a lookup had been performed. The allocation of the new producer filter entry corresponding to the second requested producer address may still be allowed to be performed in the given cycle when the read/write conflict occurs. As typically the information for selecting the entry to be replaced may already have been read in the first pipeline stage in the previous cycle, in a cycle with a read/write conflict it may be more efficient to allow the allocation of the new producer filter entry to proceed in the second pipeline stage, and treat the requested producer prefetch being processed at the first pipeline stage corresponding to the first requested producer address as if it missed in the producer prefetch filter table. It may be relatively rare that that requested producer prefetch in the cycle when the read/write conflict occurs is a producer prefetch that would in any case have hit in the producer prefetch table, and so occasionally allowing such producer prefetches to be processed redundantly may not incur a great performance penalty. The energy saving by not implementing additional read/write ports to deal with this rare occurrence may be considered more significant so as to not justify expending the additional read/write port and tolerate an occasional redundant producer prefetch being allowed to be initiated.

Examples of Indirect Prefetching Based on Producer-Consumer Relationships

In accordance with some examples there is provided a data processing apparatus comprising: a data cache to store local copies of data items for use during execution of instructions by processing circuitry; a producer pattern history table to store a plurality of producer-consumer relationships, each producer-consumer relationship defining an association between a producer load indicator and a plurality of consumer load entries, each consumer load entry comprising a consumer load indicator and one or more usefulness metrics; and prefetch generation circuitry to generate a prefetch of data for the data cache based on a data load from an address, wherein the prefetch generation circuitry is adapted to, when the data load corresponds to the producer load indicator in the producer pattern history table and when at least one of the corresponding one or more usefulness metrics associated with the producer load indicator meets a criterion: initiate a producer prefetch of the data; and when the data is returned, issue one or more consumer prefetches, each consumer prefetch to return corresponding consumer data from a corresponding consumer address generated from the data returned by the producer prefetch and a corresponding consumer load indicator of a corresponding consumer load entry.

The prefetch generation circuitry is an example of the indirect prefetch circuitry mentioned earlier. Hence, the indirect prefetch circuitry may have any of the features of the prefetch generation circuitry mentioned below.

During the execution of instructions the processing circuitry may make use of a number of data items. Data items stored as local copies in the data cache provide lower latency during accesses due to the physical locality of the cache with respect to the processing circuitry, the bandwidth for data transfer between the processing circuitry and the cache, and so on. If a data item is already present in the cache when it is required by the processing circuitry the data item is accessed more quickly than if the processing circuitry has to wait for the data processing apparatus to retrieve the data item from storage that is located further downstream (i.e., further from the processing circuitry) in the memory hierarchy. In order to reduce the time that the processing circuitry has to wait for data to be retrieved, prefetching techniques are used to predict which data is likely to be required by the processing circuitry before the processing circuitry encounters a load instruction specifying that data. Prefetching circuitry can achieve this for regular and repeating data accesses through the analysis of data access patterns. However, prefetching becomes more difficult in cases where data access patterns have irregular and/or non-repeating access patterns.

A common set of data accesses that have an irregular and/or non-repeating access pattern are loads that exhibit a producer-consumer relationship, where a consumer load is a load that is based on the data returned by the producer load. Producer-consumer relationships may involve a single producer load on which a plurality of consumer loads are based. In order to identify producer-consumer relationships and issue corresponding prefetches there is provided a producer pattern history table. The producer pattern history table stores a plurality of producer-consumer relationships. Each of the producer-consumer relationships define a correspondence between a producer load indicator, which can be used to identify when a load or a prefetch is likely to be a producer load, and a plurality of consumer load entries where each consumer load entry defines a consumer load indicator and one or more usefulness metrics. In this way not only can a load (where it is implicit that such a load may also itself be a prefetch load) be identified as a producer load, but corresponding consumer loads, that have been identified as being likely to be based on the data returned from the producer load, can also be identified and issued as consumer prefetches.

In response to a data load/prefetch from an address, the prefetch generation circuitry first checks to determine whether the data load corresponds to a producer load indicator stored in the producer pattern history table. If the data load hits in the producer pattern history table then it is determined, based on whether the one or more usefulness metrics (which will be described in more detail below) associated with the entry that hit in the producer pattern history table meet a criterion, whether to generate a producer prefetch corresponding to the load. If the criterion is met, then the prefetch generation circuitry generates a producer prefetch specifying the data. When the data has been returned, the prefetch generation circuitry is able to use this data, in combination with the plurality of corresponding consumer load indicators, to generate one or more consumer prefetches based on this data. In this way loads that exhibit a producer-consumer relationship can be identified and a producer prefetch can be issued, from which one or more consumer prefetches can be issued once the data associated with the producer prefetch has been returned. Whilst the producer pattern history table is adapted to store a plurality of (two or more) consumer prefetches in association with each producer prefetch, the prefetch generation circuitry may generate one or more consumer prefetches as discussed below.

The producer load indicator may comprise any indicator that defines the producer load. For example, in some embodiments the producer load indicator may comprise a program counter value indicative of the program position of the producer load instruction corresponding to the producer load. In other alternative embodiments the producer load indicator may comprise an address indicator indicative of an address from which data associated with the producer load is to be loaded. Similarly, the consumer load indicator comprises an indicator that defines the consumer load. For example, the consumer load indicator may comprise a program counter value indicative of a program position of the consumer load instruction corresponding to the consumer load. Alternatively, the consumer load indicator may comprise a program counter offset or other information from which the program counter value indicative of a position in the consumer load instruction can be derived.

In accordance with some example configurations the consumer load indicator comprises an offset in address space between the data returned by the producer prefetch and the corresponding consumer address. In this way the offset can be combined with the data returned by the producer prefetch in order to determine the corresponding consumer address. The person of ordinary skill in the art will recognise that this is not the only way in which the consumer load indicator could be defined and that, in other embodiments, the consumer load indicator could comprise any information from which the consumer address can be derived. For example, the consumer load indicator could comprise an operand to be used in a mathematical operation from which the consumer address can be calculated. Such operands include, but are not limited to: a partial offset such that the consumer address can be derived from the data returned from the producer prefetch, the partial offset and another offset either hardwired into the prefetch generation circuitry or defined elsewhere in the data processing apparatus; a multiplier to generate the consumer address as a result of the data returned from the producer prefetch multiplied by the multiplier; an index into a table identified by the data returned from the producer prefetch; and so on.

In accordance with some example configurations, when the consumer load indicator corresponds to a further producer load indicator in the pattern history table, the consumer prefetch is issued as a further producer prefetch. This results in a potentially recursive scheme in which a first producer load can generate a first plurality of consumer prefetches, and where each of the first plurality of consumer prefetches could correspond to an entry in the producer pattern history table. For each of the first plurality of consumer prefetches that corresponds to an entry in the producer pattern history table, the corresponding consumer prefetch is instead issued as a producer prefetch which will generate a second plurality of consumer prefetches. Each of the second plurality of consumer prefetches may, in turn, also be issued as producer prefetches if they correspond to an entry in the producer pattern history table.

In accordance with some example configurations, issuing the further producer prefetch is independent of whether the corresponding usefulness metric meets the criterion. As the initial prefetch is only issued as a producer prefetch when the corresponding usefulness metric meets the criterion, the further producer prefetches may be assumed to meet the usefulness criterion because the producer prefetch has already been determined to be useful.

In accordance with some example configurations the further producer prefetch is associated with a prefetch depth counter indicative of a number of preceding producer prefetches from which the further producer prefetch is derived, and wherein when the prefetch depth counter reaches a depth threshold, the further producer prefetch is discarded. As a result of the recursive way in which producer prefetches may be generated, it is possible that the producer prefetch can generate a further producer prefetch, which in turn generates a still further producer prefetch. In order to prevent the possibility of recursive generation of producer prefetches continuing indefinitely, the prefetch generation circuitry restricts the maximum number of recursively generated producer prefetches from exceeding a maximum depth defined by the depth threshold. For example, if the depth threshold was three, then the producer prefetch (depth counter=0) could generate a further producer prefetch (depth counter=1) which could, in turn, generate another further producer prefetch (depth counter=2). However, the another further producer prefetch (depth counter=2) would be unable to generate a producer prefetch with depth counter=3 because the depth counter has reached the threshold depth. It will be appreciated by the person of ordinary skill in the art that the choice of three for the depth threshold is purely by way of example and that any value could be used for the threshold depth. In addition, the condition of the depth counter reaching the threshold depth could be implemented by checking if the depth counter is equal to the depth threshold; checking if the depth counter has exceeded a number that is one less than the depth threshold; or by any other means by which the depth counter can be compared to the depth threshold.

In accordance with some example configurations the one or more usefulness metrics for each entry of the plurality of consumer load entries comprise a confidence value indicative that a previous load based on the corresponding consumer address was issued subsequent to the producer load, and wherein the criterion being met requires the confidence value to reach a confidence threshold. The confidence value provides a measure of whether it is likely that the consumer address, generated from the data returned by the producer prefetch and a corresponding consumer load indicator of the corresponding consumer load entry, is going to be used in a load subsequent to the producer load. In some embodiments the confidence value could be represented by a single bit indicative of whether the consumer load based on the consumer address has been observed to occur subsequent to the producer load more than a threshold number of times. In alternative embodiments, the confidence value could be represented by a counter that is indicative of a number of times that the consumer load based on the consumer address has been observed to occur subsequent to the producer load. In this way, the prefetch generation circuitry can be adapted to only issue consumer loads for which, based on previous observations, it is determined that there is a reasonable likelihood that a load based on the consumer address will follow the load based on the producer address.

In accordance with some example configurations, in addition to determining whether one or more of the confidence values associated with the producer meets a confidence threshold, the data processing apparatus may determine which consumer prefetches to issue based on whether the confidence value associated with the consumer entry meets the confidence threshold.

In accordance with some example configurations the one or more usefulness metrics for each entry of the plurality of consumer load entries comprises a timeliness value indicative of whether data loaded based on the address generated from the producer data is likely to return in time to generate a timely consumer prefetch, and wherein the criterion being met further requires the timeliness value to indicate that the producer data is likely to return in time to generate the timely consumer prefetch. The timeliness value indicates that it is likely that the data required to be returned from the consumer load is not required until a sufficient period of time has elapsed, subsequent to the producer load being issued, such that the producer load has returned the data to be used in the generation of consumer load address. For example, if the consumer load immediately follows the producer load in program execution order, it may be expected that there is not sufficient time for the producer load to return data before the consumer load based on the data returned from the producer load is issued. In this case, it may not be beneficial to issue a consumer load and therefore the timeliness value would indicate the data loaded is unlikely to return in time. The timeliness indicator may be variously defined. In some embodiments the timeliness indicator may be a single bit indicative of whether or not the consumer load is likely to return in time to generate the timely consumer prefetch. In other embodiments the timeliness value may comprise a counter indicative of a time difference between the issuing of the producer load and the issuing of the consumer load from which it can be determined, at the time that the prefetch is to be issued, whether there would be sufficient time for the data to return.

In accordance with some example configurations where the usefulness metric comprises both a confidence value and a timeliness value, the prefetch generation circuitry may be adapted to initiate the producer prefetch based on an indication that at least one of the corresponding consumer entries has both a confidence value meeting a confidence threshold and a timeliness value that indicates that the producer data is likely to return in time to generate the timely consumer prefetch. In this way producer prefetches are only generated that are inherently timely and where there is an indication that the producer prefetch will return data in that is timely with respect to a consumer prefetch for which there is a confidence value meeting the threshold confidence. In addition, when the data is returned, the prefetch generation circuitry may issue consumer prefetches independent of the corresponding timeliness values, but in dependence on the confidence value, such that only consumer entries that have a confidence value that meets the confidence threshold are issued as consumer prefetches. This is because it is assumed that, if the consumer prefetches are upgraded to further producer prefetches they will already be inherently timely due to the timeliness criterion being met by the producer prefetch.

In accordance with some example configurations the data processing apparatus further comprises producer training table circuitry to store a producer training table comprising a candidate producer-consumer relationship, and training circuitry to populate the candidate producer-consumer relationship during a training phase based on a plurality of observed loads. The producer training table stores the candidate producer-consumer relationship whilst in the training phase so that the candidate producer-consumer relationship can be built up based on the plurality observed loads. The training phase can occur either in parallel to the issuing of producer prefetches and consumer prefetches by the data processing apparatus, or during a separate training phase in which the issuing of prefetches is suppressed.

In accordance with some example configurations the one or more usefulness metrics comprises a confidence value indicative that a previous load based on the corresponding consumer address was issued subsequent to the producer load, and the training circuitry is adapted to, at the start of the training phase: when an observed load of the training phase corresponds to an existing producer load indicator in one of the plurality of producer-consumer relationships stored in the pattern history table: derive a candidate producer-consumer relationship from the producer-consumer relationship corresponding to the observed load; enter the candidate producer-consumer relationship into the producer training table; and modify candidate confidence values associated with the candidate producer-consumer relationship in a first direction; and when the observed load of the training phase does not correspond to the existing producer load indicator in any of the plurality of producer-consumer relationships stored in the pattern history table: create the candidate producer-consumer relationship comprising information indicative of the observed load; and enter the candidate producer-consumer relationship into the producer training table.

During the training phase, the training circuitry selects an observed load to be inserted into the training table stored in the training table circuitry. The observed load is selected as a load issued during the training phase, although the observed load could also be selected prior to the training phase. If the observed load corresponds has a load indicator that corresponds to a producer load indicator in an existing producer-consumer relationship that is already present in the producer pattern history table, then the existing producer-consumer relationship is used to derive the candidate producer-consumer relationship to be stored in the producer training table. When the candidate producer-consumer relationship is derived in this way, the candidate confidence values of the candidate producer-consumer relationship are modified in a first direction to indicate that the confidence in the relationship between the candidate producer and the corresponding candidate consumer is reduced. Alternatively, if the observed load has a load indicator that does not correspond to a producer load indicator in an existing producer-consumer relationship, then the candidate producer-consumer relationship to be entered into the training table is derived based on information indicative of the observed load.

In accordance with some example configurations the producer training table is adapted to store, in association with the candidate producer-consumer relationship, data returned in response to the observed load. By storing the data returned in response to the observed load, the producer training table is able to determine if a relationship exists between subsequently observed loads and the observed load.

In accordance with some example configurations for each subsequent observed load of the plurality of observed loads, in response to detecting a match between a most significant portion of the data returned by the observed load and a candidate address associated with the subsequent observed load, the training circuitry is adapted to derive a candidate consumer entry based on a difference between the least significant portion of the data returned by the observed load and the candidate address associated with the subsequent observed load. A match between the most significant portion of the candidate address and the most significant portion of the data returned by the observed load indicates that the data returned by the observed load could define an address that is close in address space to the candidate address. When this is the case the training circuitry uses the candidate address and the data returned by the observed load to derive the candidate consumer entry. As previously discussed, in some embodiments the candidate consumer entry could comprise a consumer offset in address space. In such embodiments the consumer offset could be given by the difference between the least significant portion of the data returned by the observed load and the least significant portion of the candidate address. In some embodiments the candidate consumer information can be derived by any method for which there is a one-to-one relationship between the consumer information and the difference between the candidate address and the least significant portion of the data returned by the observed load.

In accordance with some example configurations the training circuitry is adapted to: when the candidate consumer entry corresponds to an existing consumer entry of the candidate producer-consumer relationship, modify an existing candidate confidence value of the existing consumer in a second direction; when the candidate consumer entry is different from each existing consumer entry of the candidate producer-consumer relationship and when an existing consumer entry of the candidate producer-consumer relationship has a candidate confidence value that meets a replacement criterion, replace the existing consumer entry having with the candidate consumer entry; and when the candidate consumer entry is different from each existing consumer entry of the candidate producer-consumer relationship and when a corresponding candidate confidence value of each existing consumer entry does not meet the replacement criterion, discard the candidate consumer entry. In this way the existing consumer entries of the candidate producer-consumer relationship are kept up to date based on the subsequent observed loads in the training phase. As previously discussed, at the start of the training phase the confidence values of the candidate producer-consumer relationship are modified in a first direction (or "aged") to indicate that the confidence in those predictions has reduced since the producer-consumer relationship was derived. When the subsequent observed loads of the training phase have a similar behaviour to those observed in a previous training phase, as represented by the existing consumer entries, the confidence values of the existing consumer entries will be modified in a second direction to indicate that a load corresponding to the existing consumer entry is still being observed. As a result, the consumer load indicators of the existing consumer entry are likely to meet the usefulness criterion and a greater number of consumer prefetches will be issued. On the other hand, when the subsequent observed loads of the training phase have a different observed behaviour to those observed in a previous training phase, as represented by the existing consumer entries, the existing consumer entries are more likely to meet the replacement criterion and be replaced as a result of having their confidence values modified in the first direction. In the event that the confidence in all the existing consumer entries associated with the producer-consumer relationship remain high, the candidate consumer entry is discarded.

In accordance with some example configurations the one or more usefulness metrics further comprises a timeliness value indicative of whether data loaded based on the address generated from the producer data is likely to return in time to generate a timely consumer prefetch, and wherein the training circuitry is adapted to, when a difference between the observed load and the subsequent observed load meets a difference criterion, set a candidate timeliness value of the candidate producer-consumer relationship. In this way the timeliness of consumer entries of the candidate producer-consumer relationship can be kept up to date for subsequent use to determine whether a candidate producer prefetch issued based on the candidate producer-consumer relationship will generate timely consumer prefetches. In some embodiments, the timeliness value is only considered in the generation of producer prefetches based on an initial load, whilst on the other hand producer prefetches based on a prefetch are assumed to be inherently timely because the prefetch on which they are based being inherently timely.

In accordance with some example configurations the difference between the observed load and the subsequent observed load is one of: a difference in program counter value; a number of loads; and a number of cycles. It would be readily apparent to the person of ordinary skill in the art that any measure of a temporal difference between the observed load and the subsequent observed load could be used to set the timeliness metric.

In accordance with some example configurations subsequent to the plurality of observed loads the candidate producer-consumer relationship is inserted into the pattern history table. In this way the producer pattern history table is kept up to date based on the latest observed behaviour during the training phase. When the candidate producer-consumer relationship is derived from an existing entry in the producer pattern history table, the candidate producer-consumer relationship replaces the existing entry from which it was derived. However, when the candidate producer-consumer relationship is based on a load that does not correspond to an existing entry of the producer pattern history table, the candidate producer-consumer relationship may be inserted into the producer pattern history table based on a replacement policy. Typical replacement policies will be known to the person of ordinary skill in the art. For example, the least recently used entry of the pattern history table could be replaced by the candidate producer-consumer relationship. In other embodiments, the entry in the producer pattern history table with the lowest total consumer confidence values could be replaced. When the producer pattern history table is not full the candidate producer-consumer relationship can be inserted into the producer pattern history table without the need to replace an existing entry.

In accordance with some example configurations the data processing apparatus further comprises stride prefetching circuitry to issue a stride prefetch load based on a predicted stride length, wherein the prefetch generation circuitry is adapted to, when the stride prefetch load corresponds to the producer load indicator in the producer pattern history table, initiate the producer prefetch independent of whether the corresponding usefulness metric meets the criterion. Stride prefetching circuitry generates prefetches based on an analysis of access patterns. Because the producer prefetch is based on a stride prefetch load from the stride prefetching circuitry the producer prefetch inherently corresponds to a prefetch that will be of use. Hence, it is not necessary to check whether the corresponding usefulness metric meets the criterion. In embodiments where the one or more usefulness metrics for each entry of the plurality of consumer load entries comprises a timeliness value indicative of whether data loaded based on the address generated from the producer data is likely to return in time to generate a timely consumer prefetch, the generation of the producer prefetch from a stride prefetch load means that there is already a difference between a current program counter value and the program counter value associated with the stride prefetch. Hence, the producer prefetch will be inherently timely due to the difference already present. In this way a greater number of producer prefetches and hence consumer prefetches can be issued resulting in a lower latency observed by the processing circuitry when executing instructions.

In accordance with some example configurations the data processing apparatus further comprises producer tag table circuitry to store a producer tag table comprising a plurality of prefetch entries defining in-flight prefetches, each prefetch entry comprising a prefetch data address, wherein initiating each producer prefetch comprises generating a candidate producer entry for insertion into the producer tag table, and wherein initiating each consumer prefetch comprises generating a candidate consumer entry for insertion into the producer tag table. In this way, the producer tag table circuitry is able to keep track of each in flight prefetch and to ensure that consumer prefetches are scheduled subsequent to the completion of the corresponding producer prefetch.

In accordance with some example configurations each entry in the producer tag table further comprises a prefetch identifier, wherein the data processing apparatus is adapted to, in response to generation of the candidate producer entry: when a candidate prefetch data address of the candidate producer matches an existing entry in the producer tag table, discard the candidate producer entry; when the candidate prefetch data address of the producer entry corresponds to a same cache line as an existing entry in the producer tag table, insert the candidate producer entry into the producer tag table with a same prefetch identifier as the existing entry; and when the candidate prefetch data address of the candidate producer entry is different to all existing entries in the producer tag table, insert the candidate producer entry into the producer tag table with a new prefetch identifier. In this way the data processing apparatus is prevented from issuing producer prefetches corresponding to a same block of memory twice. In particular, where the candidate prefetch data address matches an existing entry, the existing entry will already ensure that the data is prefetched. Hence, issuing the candidate producer as a second prefetch for the same data would be wasteful and it is discarded. Alternatively, when the candidate prefetch data address of the producer entry corresponds to the same cache line as an existing entry in the producer tag table, but to a different entry within the cache line, the candidate producer entry is added into the producer tag table to indicate that a different entry from the cache line is required, but a same prefetch identifier as the existing entry is used to prevent the data processing apparatus from issuing a prefetch for the same cache line multiple times. Finally, if the candidate prefetch data address is different to all existing entries in the producer tag table then the candidate producer entry corresponds to a different prefetch and it is inserted into the producer tag table with a new prefetch identifier.

In accordance with some example configurations the data processing apparatus further comprises a sequence buffer to store the data returned from the producer prefetch in association with data indicative of a corresponding producer tag table entry: and sequencer circuitry to, when the data returned from the producer prefetch reaches a head of the sequence buffer: sequentially generate a plurality of consumer addresses to be sent as the one or more consumer prefetches; and invalidate the corresponding producer tag table entry. In this way the consumer prefetches are held until the corresponding data from the producer prefetch is returned to the sequence buffer. Once the data has been returned and the data reaches the head of the sequence buffer, the sequencer circuitry generates the consumer addresses based on the data that has been returned and issues the plurality of consumer prefetches. Once the plurality of consumer prefetches are issued the corresponding producer entry in the producer tag table can be invalidated.

Particular examples will now be described with reference to the figures.

FIG. 1 illustrates details of a data processing apparatus 10 in accordance with some example configurations. The data processing apparatus 10 comprises: processing circuitry 12 to execute instructions; a data cache 14 to store local copies of data items for use during execution of the instructions by the processing circuitry 12; a producer pattern history table 18 to store a plurality of producer-consumer relationships 30(1), 30(2), . . . , 30(N), where the number in parentheses indicates which entry of the pattern history table the corresponding information relates to: and prefetch generation circuitry 16 to generate a prefetch of data for the data cache 14 based on a data load from an address. Each of the producer-consumer relationships 30 comprises a producer load indicator 20 and a plurality of consumer load entries. Each consumer load entry comprises a consumer load indicator 22, 26 and one or more usefulness metrics 24, 28. The prefetch generation circuitry 16 is adapted to determine, in response to a data load, if the data load corresponds to a producer load indicator 20 of a producer-consumer relationship 30 in the producer pattern history table 18 and if at least one of the corresponding usefulness metrics 24, 28 meets a criterion. When the aforementioned conditions are satisfied, the prefetch generation circuitry 16 initiates a producer prefetch of the data and, when the data is returned, the prefetch generation circuitry 16 issues one or more consumer prefetches, each consumer prefetch to return corresponding consumer data from a corresponding consumer address generated from the data returned by the producer prefetch and a corresponding consumer load indicator 22, 26.

Figure 2:
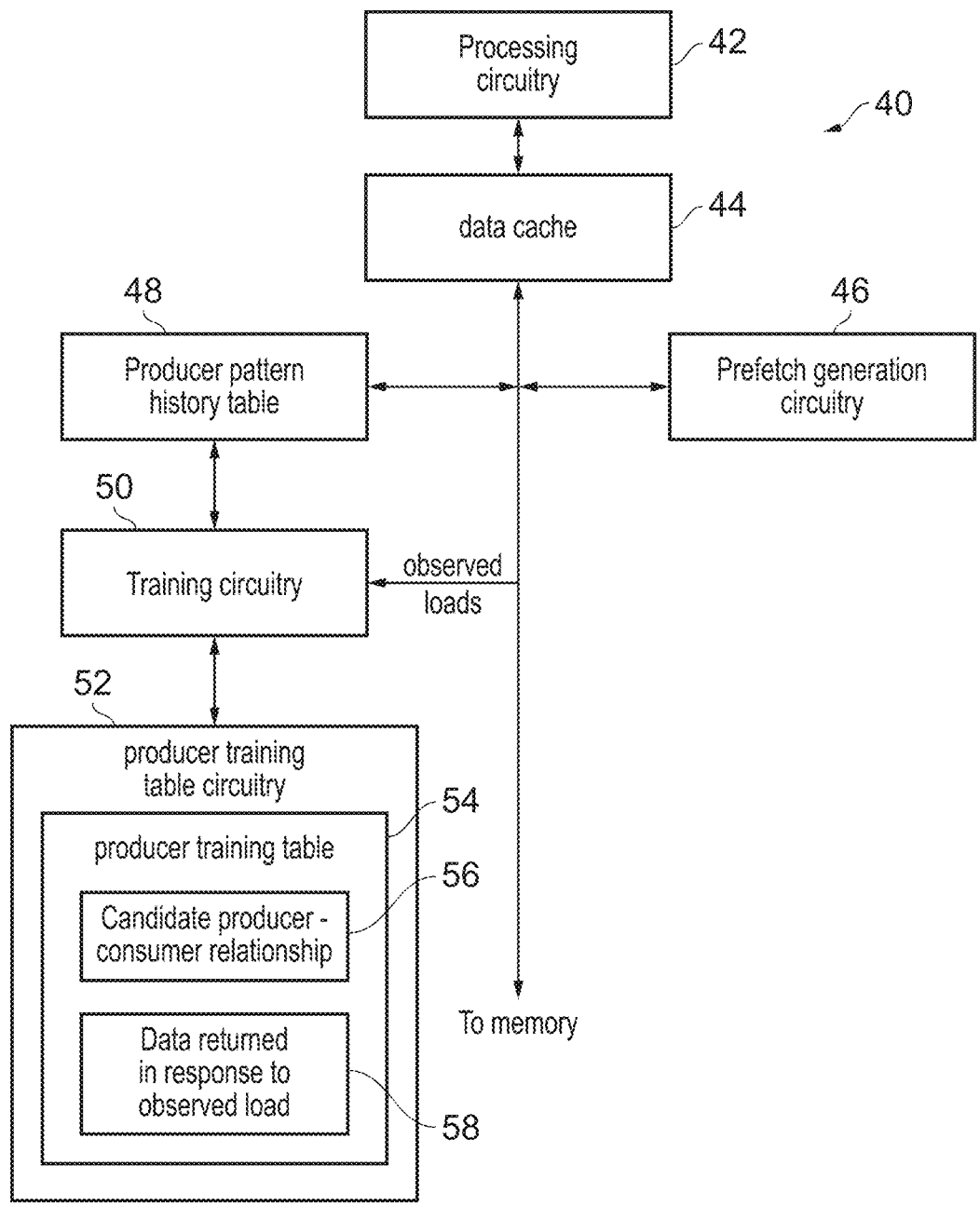
FIG. 2 schematically illustrates details of a data processing apparatus comprising training circuitry.

FIG. 2 illustrates details of a data processing apparatus 40 comprising training circuitry 50 for use in the training phase. The data processing apparatus 40 comprises a number of components common to the data processing apparatus 10 described in detail in reference to FIG. 1, and these common features will therefore only briefly be described here. The data processing apparatus 40 comprises processing circuitry 42, a data cache 44, prefetch generation circuitry 46 and a producer pattern history table 48. In addition, data processing apparatus 40 comprises training circuitry 50 and producer training table circuitry 52 to store a producer training table 54. The training circuitry 50 is adapted to populate a candidate producer-consumer relationship 56 stored in the producer training table 54 during a training phase based on a plurality of observed loads. The producer training table 54 comprises the candidate producer-consumer relationship 56 and data returned in response to an observed load 58 at the start of the training phase. When the observed load corresponds to a producer-consumer relationship 30 in the producer pattern history table the candidate producer-consumer relationship 56 is derived from the corresponding producer-consumer relationship 30. For example, when the observed load corresponds to producer-consumer relationship 30(*b*), the candidate producer-consumer relationship 56 is derived from the producer-consumer relationship 30(*b*). The candidate producer-consumer relationship in this example case comprises information relating to a producer load indicator 20(*b*) and a plurality of consumer load entries. Each consumer load entry comprises a consumer load indicator 22(*b*), 26(*b*) and one or more usefulness metrics 24(*b*), 28(*b*). During the training phase the training circuitry 50 updates the candidate producer-consumer relationship 56 stored in the producer training table 54 based on a plurality of observed loads. Once the training phase is completed, the training circuitry 50 enters the candidate producer-consumer relationship 56 into the producer pattern history table 48 for use in subsequent producer prefetches and consumer prefetches.

Figure 3:
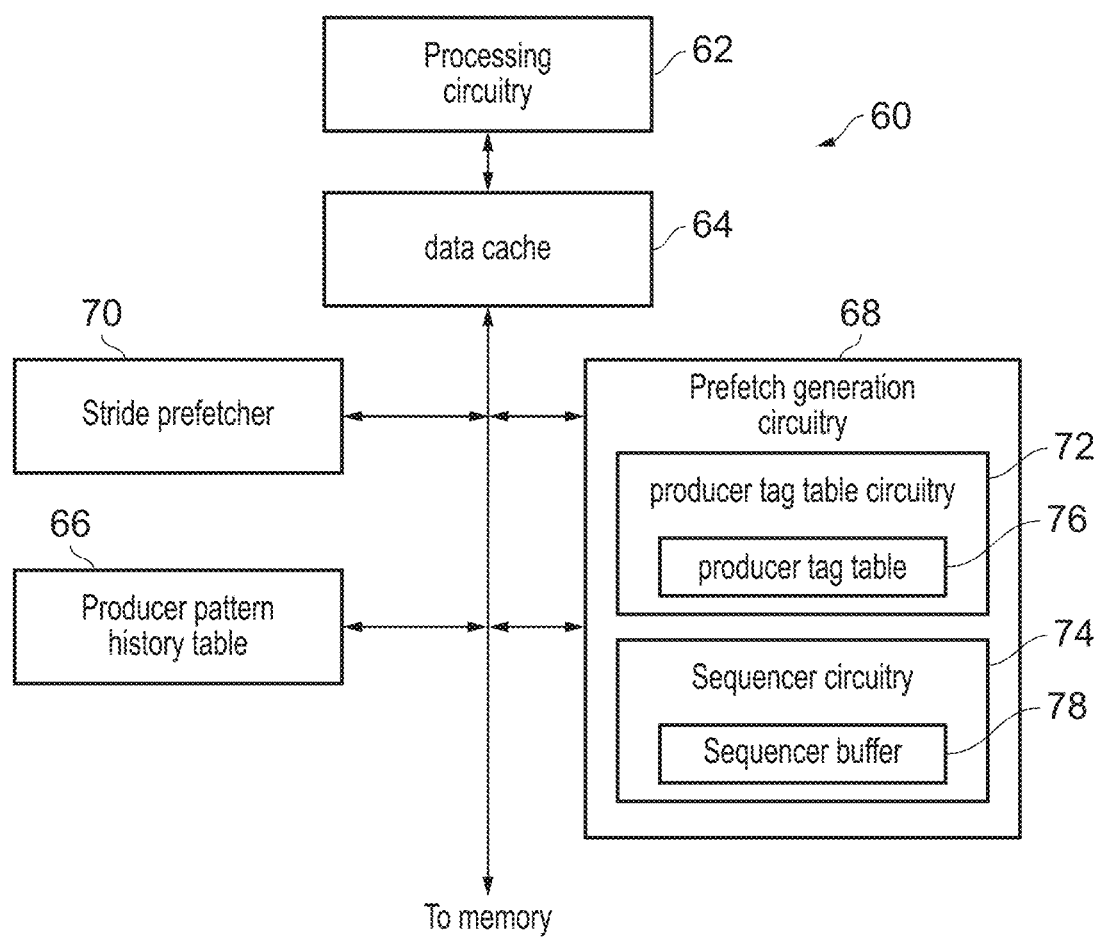
FIG. 3 schematically illustrates details of a data processing apparatus comprising a stride prefetcher.

FIG. 3 illustrates details of a data processing apparatus 60 comprising stride prefetcher 70, producer tag table circuitry 72 and sequence circuitry 74 for use in prefetch generation. The data processing apparatus 60 comprises a number of components common to the data processing apparatus 10 described in detail in reference to FIG. 1, and these common features will therefore only briefly be described here. The data processing apparatus 60 comprises processing circuitry 62, data cache 64, prefetch generation circuitry 68, and producer pattern history table 66. In addition, data processing apparatus 60 comprises stride prefetcher 70 to issue a stride prefetch load based on a predicted stride length, producer tag table circuitry 72 to store producer tag table 76, and sequencer circuitry 74 comprising sequence buffer 78. The stride prefetcher 70 generates and issues stride prefetches based on an analysis of access patterns. Prefetches generated by the stride prefetcher 70 are passed to the prefetch generation circuitry 68 which performs a lookup of the stride prefetch in the producer pattern history table 66. When the stride prefetch corresponds to a producer indicator in the producer pattern history table 66 the prefetch generation circuitry 68 issues a producer prefetch. The producer tag table circuitry 72 determines, for producer prefetches generated based on the stride prefetch or otherwise, whether an entry in the producer tag table 76 corresponds to a same address as the producer prefetch. When this is the case the producer tag table circuitry 72 discards the producer prefetch. The producer tag table circuitry 72 also determines whether an entry in the producer tag table 76 corresponds to an address of a same cache line as the producer prefetch. When this is the case the producer prefetch is entered in the producer tag table but with a prefetch identifier that corresponds to the existing entry in the producer tag table 76 corresponding to the same cache line. When neither of the aforementioned conditions are met, i.e., the producer prefetch does not correspond to a same cache line or a same address as an existing entry in the producer tag table 76, the producer tag table circuitry is adapted to enter the producer prefetch in the producer tag table 76 with a new prefetch identifier. The sequencer buffer 78 stores data returned from producer prefetches and associated data indicative of a corresponding entry in the producer tag table 76. When the data returned from the producer prefetch reaches the head of the sequence buffer 78 the sequencer circuitry 74 is adapted to sequentially generate one or more consumer addresses to be sent as the one or more consumer prefetches, and to invalidate the corresponding entry in the producer tag table 76.

Figure 4:
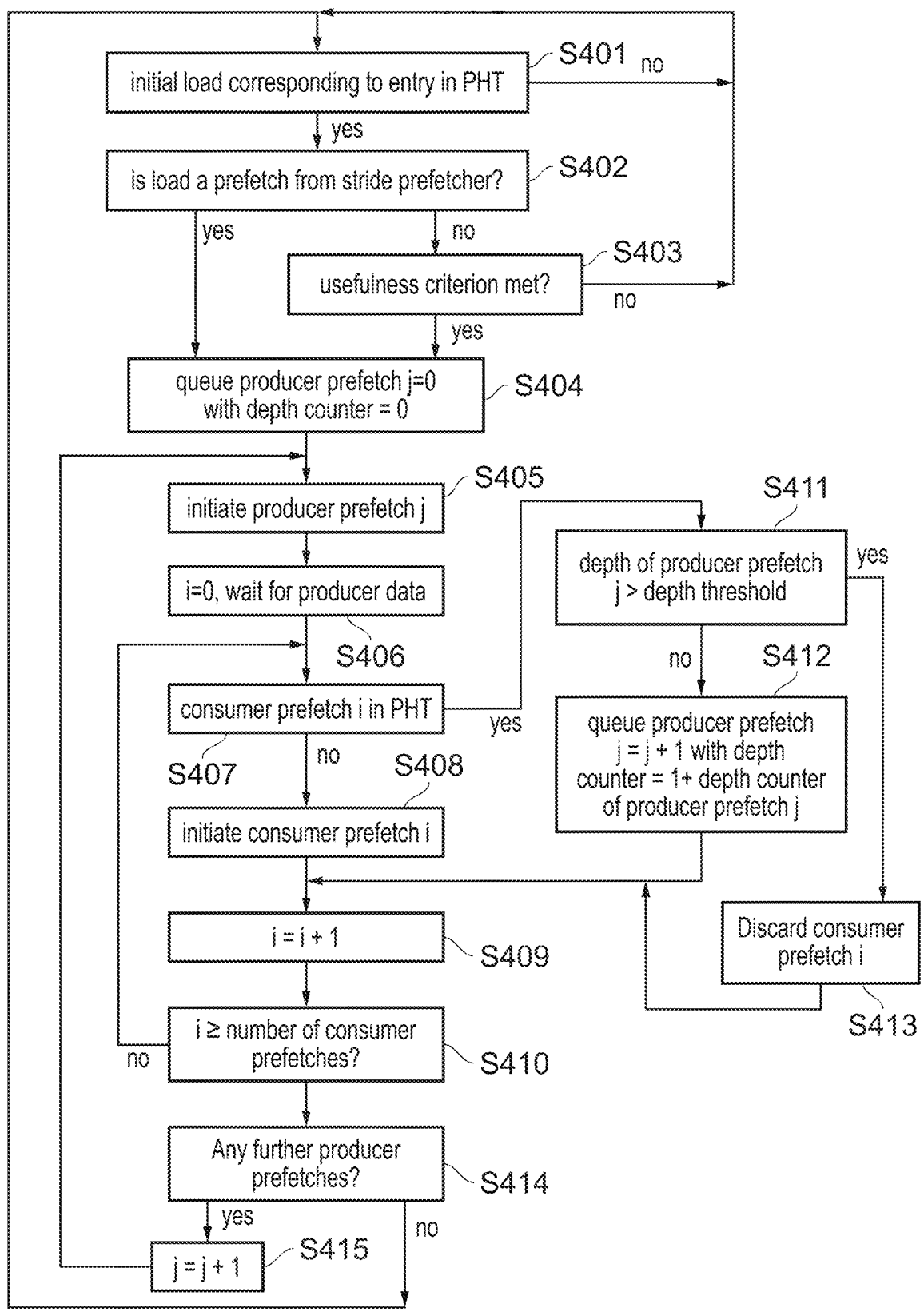
FIG. 4 illustrates a sequence of steps carried out when initiating prefetches.

FIG. 4 illustrates a sequence of steps carried out by prefetch generation circuitry 68 when initiating prefetches. Flow starts at step S401 when an initial load is received and the prefetch generation circuitry 68 determines whether or not the initial load corresponds to a producer indicator stored in the producer pattern history table 66. If no then flow returns to step S401 to wait for another initial load. If yes, then flow proceeds to step S402 where it is determined whether the load is a prefetch generated by the stride prefetcher 70. If yes then flow proceeds to step S404, if no then flow proceeds to step S403 where it is determined whether the usefulness criterion is met. If, at step S403, the usefulness criterion is not met then flow returns to step S401. If however, the usefulness criterion is met then flow proceeds to step S404 where the producer prefetch is queued with producer prefetch counter j=0 and producer depth counter=0. Flow then proceeds to step S405 where producer prefetch j is issued and step S406 where consumer prefetch index i=0 is set and flow waits for the producer data to be returned.

When the producer data is returned, flow proceeds to steps S407-S412 which determine the handling of consumer prefetches. Whilst the steps set out in steps S407-S412 of FIG. 4 illustrate the sequential issuing of consumer prefetches for each producer prefetch, consumer prefetch index i is used purely to illustrate the logical flow of how each consumer load is handled, and that consumer prefetches associated with a same producer load may all be issued in sequence or in parallel. At step S407 it is determined whether consumer prefetch i of the producer-consumer relationship j corresponds to a producer indicator in the producer pattern history table 66. If no then flow proceeds to step S408 where consumer prefetch i is issued before flow proceeds to step S409. If however, at step S407 it was determined that consumer prefetch i of the producer-consumer relationship j did correspond to a producer indicator in the producer pattern history table 66, then flow proceeds to step S411. At step S411 it is determined whether the depth of producer prefetch j is greater than the depth threshold. If no then flow proceeds to step S412 where the consumer prefetch i is upgraded to be issued as a producer prefetch with index j=j+1 and depth counter equal to 1+ the depth counter of producer prefetch j before flow proceeds to step S409. If on the other hand, it was determined at step S411 that the depth of producer prefetch j was greater than the depth threshold then flow proceeds to step S413 where consumer prefetch i is discarded before flow proceeds to step S409. In some embodiments at step S413 consumer prefetch i may be issued as a consumer prefetch rather than being discarded. However, because the depth threshold would be reached if the consumer prefetch i was upgraded to a producer prefetch, a producer prefetch for the corresponding data is not issued. At step S409 the index i is incremented before flow proceeds to step S410. At step S410 it is determined whether all consumer prefetches associated with producer prefetch j have been handled. If no then flow returns to step S407 and the next consumer prefetch is handled. If, on the other hand, it is determined at step S410 that all the consumer prefetches have been handled then flow proceeds to step S414 where it is determined if there are any more producer prefetches. If yes then flow proceeds to step S415 where j is incremented and flow returns to step S405.

If, at step S414, it is determined that there are no further prefetches then flow returns to step S401.

Figure 5:
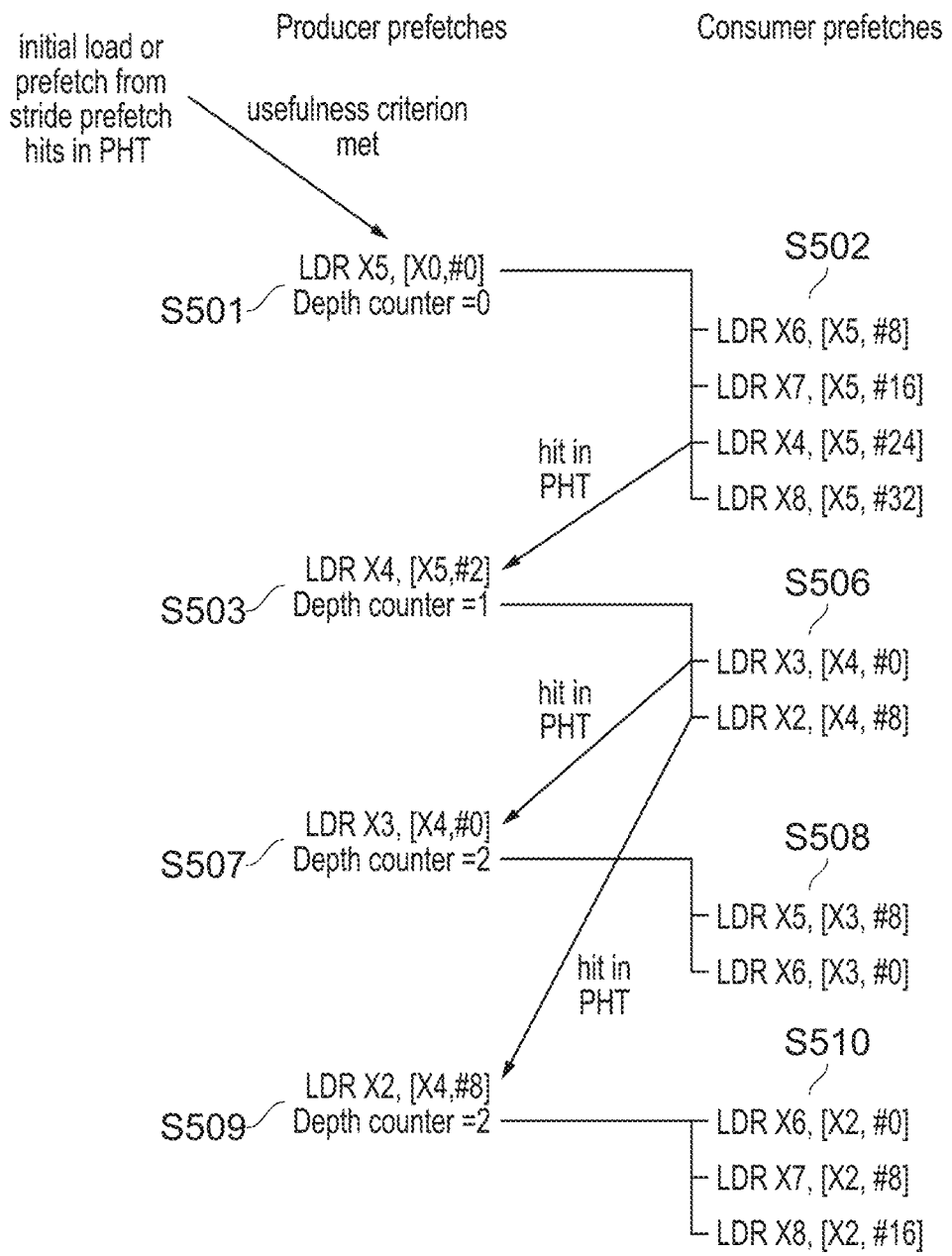
FIG. 5 illustrates a sequence of producer and consumer prefetches being processed.

FIG. 5 illustrates a sequence of producer and consumer prefetches issued based on the logic set out in FIG. 4. As illustrated, in response to an initial load instruction or a prefetch from the stride prefetcher corresponding to instruction LDR x5, [x0, #0] it is found that the load or prefetch from the stride prefetcher hits in the producer pattern history table 66. As a result, at S501, a producer prefetch with depth counter=0 is issued. When the data associated with producer prefetch corresponding to instruction LDR x5, [x0, #0] is returned, the consumer prefetches associated with the producer prefetch can be issued. In this case, at step S502 four consumer prefetches are issued. In particular, in the illustrated embodiment for a consumer prefetch associated with a particular producer prefetch to be issued, the consumer prefetch must meet a confidence threshold. In this case the four consumer prefetches corresponding to load instructions LDR x6, [x5, #8]; LDR x7, [x5, #16]; LDR x4, [x5, #24]; and LDR x8, [x5, #32] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that the consumer prefetch corresponding to load instruction LDR x4, [x5, #24] hits in the producer pattern history table 66 and this prefetch is upgraded to a producer prefetch.

At step S503 the producer prefetch upgraded from the consumer prefetch corresponding to load instruction LDR x4, [x5, #24], as identified in step S502, is issued with depth counter=1. When the data associated with the producer prefetch corresponding to load instruction LDR x4, [x5, #24] is returned, the consumer prefetches associated with the producer prefetch can be issued. In this case, at step S506 it is determined that two consumer prefetches are issued. In this case the two consumer prefetches corresponding to load instructions LDR x3, [x4, #0]; and LDR x2 [x4, #8] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that both the consumer prefetch corresponding to load instruction LDR x3, [x4, #0] and the consumer prefetch corresponding to load instruction LDR x2 [x4, #8] hit in the producer pattern history table 66 and both these prefetches are upgraded to producer prefetches which are issued at step S507 and S509 respectively.

At step S507 the producer prefetch upgraded from the consumer prefetch corresponding to load instruction LDR x3, [x4, #0], as identified in step S506, is issued with depth counter=2. When the data associated with the producer prefetch corresponding to load instruction LDR x3, [x4, #0] is returned, the consumer prefetches associated with the producer prefetch can be issued. In this case, at step S508 it is determined that two consumer prefetches are issued. In this case the two consumer prefetches corresponding to load instructions LDR x5, [x3, #8]; and LDR x6 [x3, #0] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that neither of the consumer prefetches corresponding to load instruction LDR x3, [x4, #0] and the consumer prefetch corresponding to load instruction LDR x2 [x4, #8] hit in the producer pattern history table 66. Hence, neither prefetch is upgraded to a producer prefetch and no further prefetches are generated as a result of this step.

At step S509 the producer prefetch upgraded from the consumer prefetch corresponding to load instruction LDR x2, [x4, #8], as identified in step S506, is issued with depth counter=2. When the data associated with the producer prefetch corresponding to load instruction LDR x2, [x4, #8] is returned, the consumer prefetches associated with the producer prefetch can be issued. In this case, at step S508 it is determined that three consumer prefetches are issued. In this case the three consumer prefetches corresponding to load instructions LDR x6, [x2, #0]; LDR x7, [x2, #8]; and LDR x8 [x2, #16] meet the confidence threshold and are issued. As set out in the logical flow diagram of FIG. 4, the prefetch generation circuitry 68 determines whether each consumer prefetch is also a producer prefetch listed in the producer pattern history table 66. In this case, it is determined that none of the consumer prefetches corresponding to load instructions LDR x6, [x2, #0]; LDR x7, [x2, #8]; and LDR x8 [x2, #16] hit in the producer pattern history table 66. Hence, none of these prefetches are upgraded to a producer prefetch and no further prefetches are generated as a result of this step.

Figure 6:
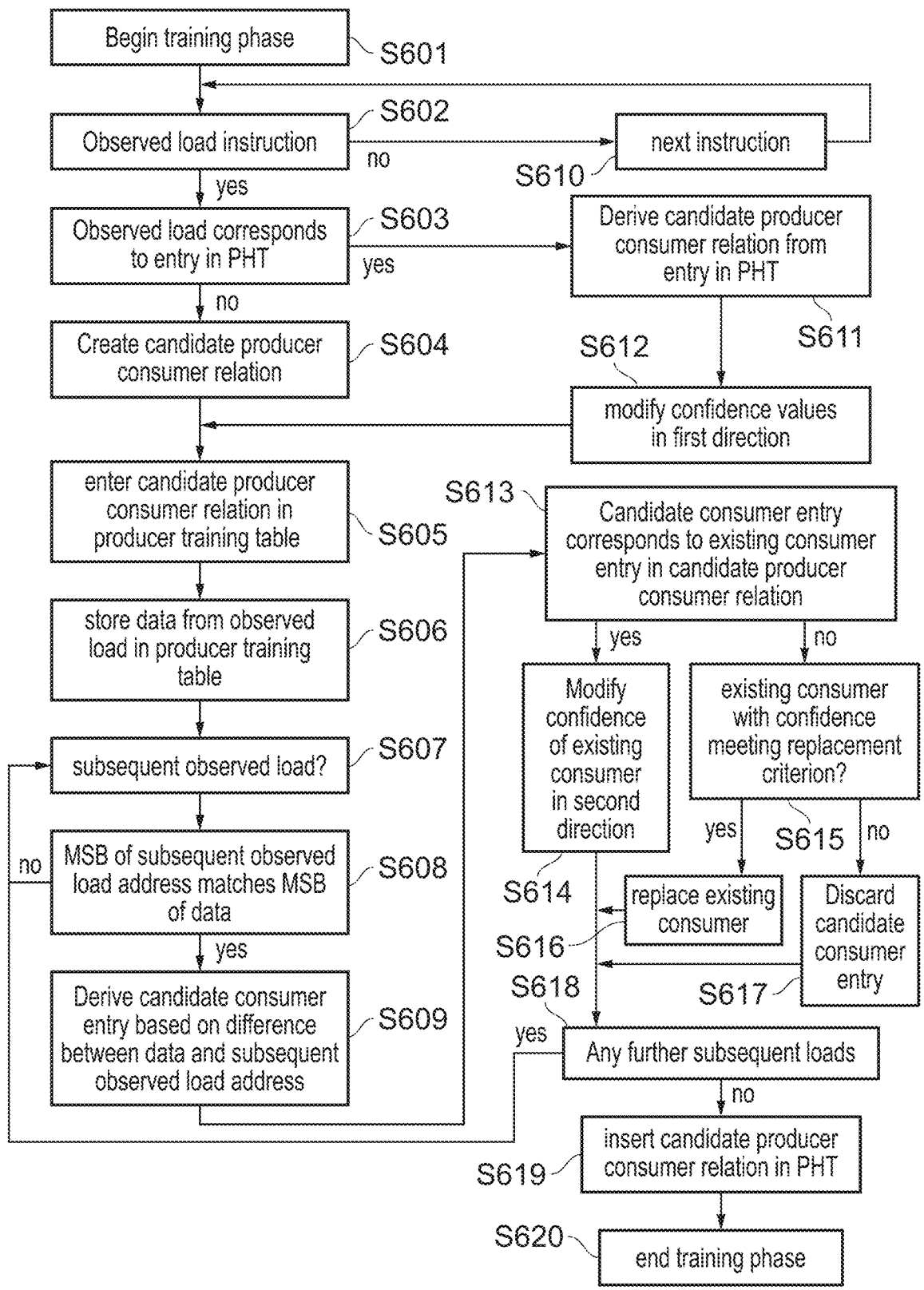
FIG. 6 illustrates a sequence of steps carried out during a training phase.

FIG. 6 illustrates a sequence of steps carried out by the data processing apparatus during a training phase with reference to the components set out in FIG. 2. Flow begins at step S601 where the data processing apparatus begins the training phase before flow proceeds to step S602. At step S602 it is determined whether a load instruction has been observed. If no then flow proceeds to step S610 where flow waits for the next instruction. If, at step S602, it is determined that a load instruction has been observed flow proceeds to step S603. At step S603 it is determined whether the observed load corresponds to an entry in the producer pattern history table 48. If yes then flow proceeds to step S611 where a candidate producer consumer relationship 56 is derived from the entry in the producer pattern history table 48. Flow then proceeds to step S612 where the confidence values, associated with the producer-consumer relationship 56 derived from the entry in the producer pattern history table 48, are modified in a first direction to indicate that confidence in the consumer identifiers associated with the candidate producer-consumer relationship is reduced. Flow then proceeds to step S605. If however, at step S603, it was determined that the observed load does not correspond to an entry in the producer pattern history table 48 then flow proceeds to step S604 where a candidate producer consumer relationship 56 is created based on the observed load before flow proceeds to step S605.

At step S605 the candidate producer-consumer relationship 56 that was either derived at step S611 or created at step S604 is entered into the producer training table 54 that is stored in the producer training table circuitry 52. Flow then proceeds to step S606 at which data returned in response to the observed load 58 is stored in the producer training table 54 that itself is stored in the producer training table circuitry 42. Flow then proceeds to step S607 where flow waits for a subsequent observed load. When a subsequent observed load is observed flow proceeds to step S608 where it is determined whether the most significant bit (MSB) of the subsequent observed load address matches the most significant bit of the data returned in response to the observed load 58. If, at step S608, there is not an observed match then flow returns to step S607 to wait for the next subsequent observed load. If however, at step S608, it is determined that there is a match then flow proceeds to step S609, where a candidate consumer entry is derived based on the difference between the data returned in response to the observed load 58 and the subsequent observed load address. Flow then proceeds to step S613 where it is determined whether the candidate consumer entry, derived in step S609, corresponds to an existing consumer entry in the candidate producer consumer relationship 56. If yes then flow proceeds to step S614 where the confidence value of the corresponding existing consumer is modified in a second direction to indicate that a confidence of observing the existing consumer subsequent to the producer load is increased. Flow then proceeds to step S618. If however, at step S613, it was determined that the candidate consumer entry does not correspond to any existing consumer entries in the candidate producer-consumer relationship 58 then flow proceeds to step S615. At step S615 it is determined whether there are any existing consumers with confidence values meeting the replacement criterion. If yes then flow proceeds to step S616 where the candidate consumer entry replaces the existing consumer entry before flow proceeds to step S618. If however, at step S615 it was determined that there are no existing consumer entries with confidence meeting the replacement criterion then flow proceeds to step S617 where the candidate consumer entry is discarded before flow proceeds to step S618. At step S618 it is determined whether there are any further subsequent loads to be observed. If yes then flow returns to step S607. If however, at step S618, it is determined that a sufficient number of subsequent loads have been observed then flow proceeds to step S619 where the candidate producer-consumer relationship 56 is inserted into the producer pattern history table 48 before flow proceeds to step S620 where the training phase ends.

Figure 7:
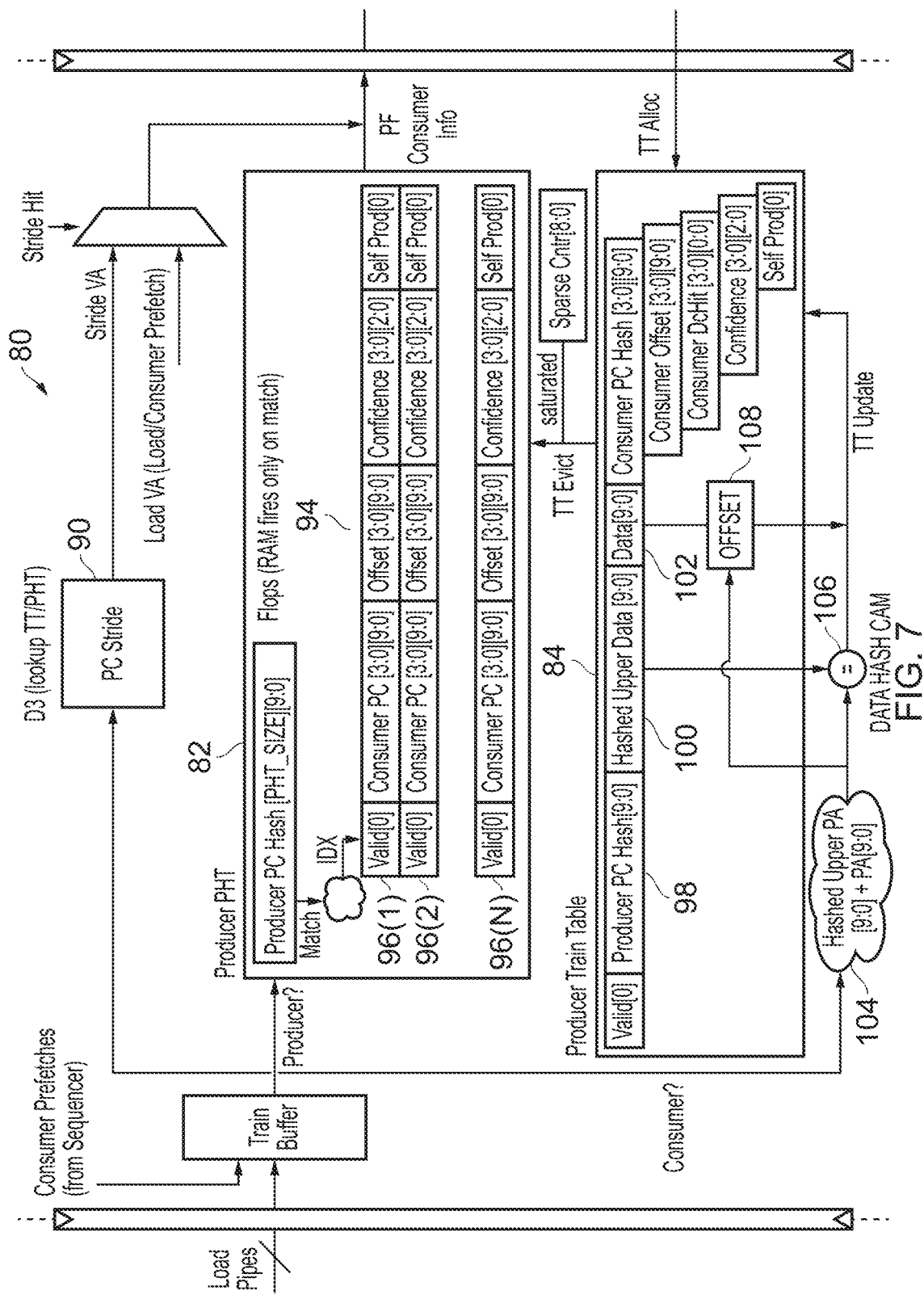
FIG. 7 schematically illustrates more details of a data processing apparatus.
Figure 7:
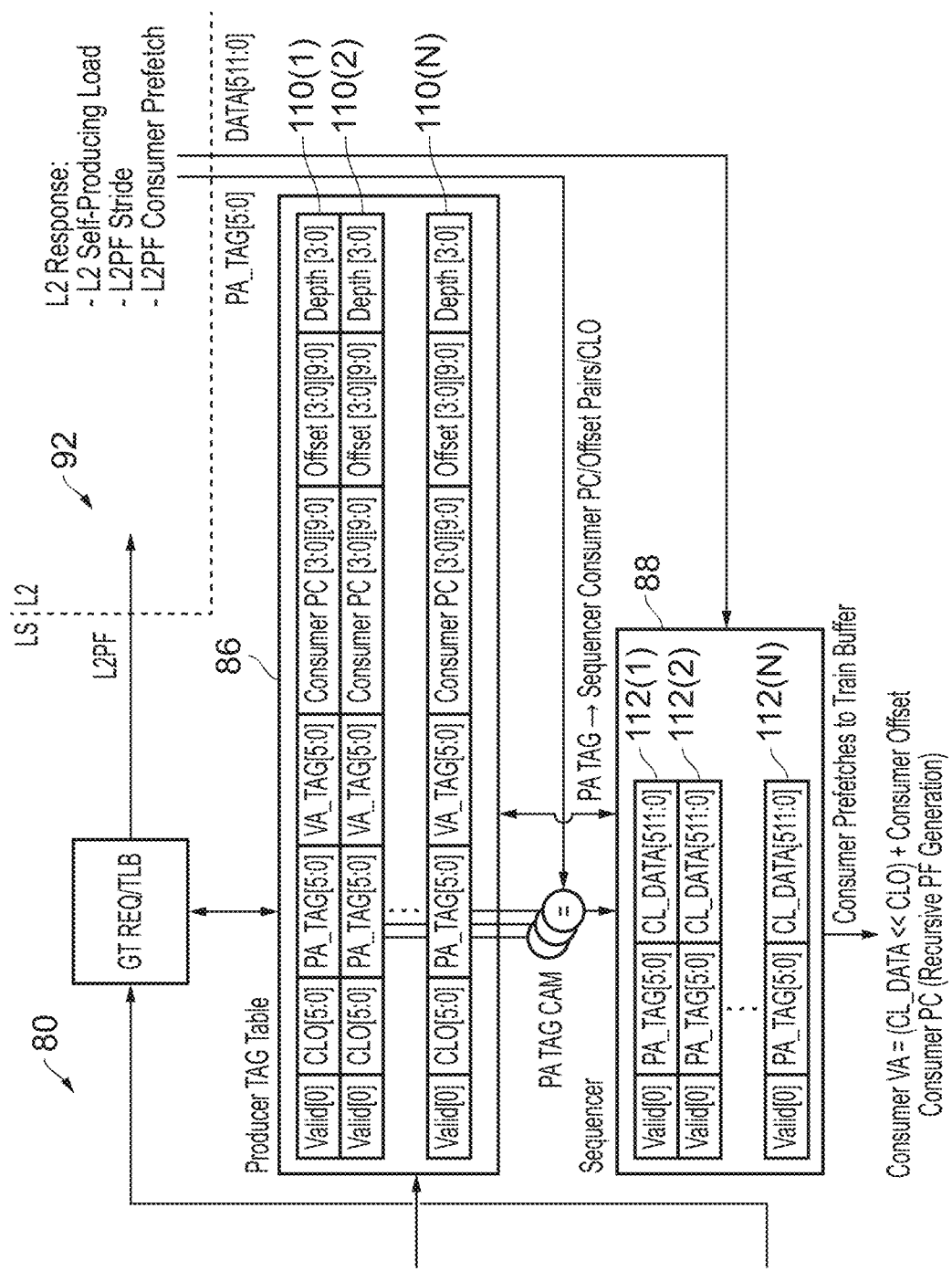

FIG. 7 illustrates a data processing apparatus according to some example configurations. Data processing apparatus 80 comprises producer pattern history table 82, producer training table 84, producer tag table 86, sequencer 88, stride prefetcher 90 and cache 92. Producer pattern history table 82 stores a plurality of producer-consumer relationships 92 which may be indexed by a producer indicator corresponding to a hash of the producer program counter value. The number of producer-consumer relationships 92 stored in the producer pattern history table 82 can be any number. For example, in some embodiments producer pattern history table 82 could store sixty four producer-consumer relationships 94. However, in other embodiments a greater or smaller number of producer-consumer relationships could be included. Each producer-consumer relationship 94 stores comprises a producer load indicator and a plurality of consumer entries 96. Any number of consumer entries could be provided in each producer-consumer relationship. A greater number of consumer entries provides allows the producer pattern history table 82 to store associations between a producer identifier and a greater number of consumer identifiers. However, in contrast, a greater number of consumer entries requires a greater circuit area and power consumption and may be of limited benefit for cases in which each producer load only has a small number of associated consumer loads. In some embodiments a balance between storing associations between producers and consumers is traded off against circuit area. In some embodiments each producer-consumer relationship comprises four entries. Each consumer entry 96 in the producer pattern history table comprises valid bits to indicate whether the entry is valid, a consumer program counter (PC) value to indicate a corresponding load instruction, an offset to be used to generate a consumer address based on data returned from a producer load, and a confidence value indicative of whether a previous load based on the corresponding consumer address was issued subsequent to the producer load.

The producer training table 84 is used during a training phase and stores a candidate producer-consumer relationship 98 which is derived in response to a load observed at the start of the training phase and, when the load observed at the start of the training phase corresponds to an entry in the producer pattern history table 82, is based on the corresponding entry in the producer pattern history table 82. Alternatively, when the load observed at the start of the training phase does not correspond to an entry in the producer pattern history table 82, the candidate producer consumer relationship 98 is a new entry based on the load observed at the start of the training phase. The candidate producer-consumer relationship 98 comprises valid bits, a producer program counter value which may be stored as a hashed value, upper bits of the data 100 returned from the load observed at the start of the training phase which may be stored as a hashed value, lower bits of data 102 returned from the load observed at the start of the training phase, and a plurality of consumer entries as described in relation to the producer-consumer relations stored in the producer pattern history table 82. As illustrated, during the training phase and in response to a subsequent observed load with a corresponding address, the upper bits of the corresponding address may be hashed and compared to the hashed upper bits of data 100 returned from the load observed at the start of the training phase. If a match is determined 106 then an offset 108 is derived based on a difference between the lower bits of data 102 returned from the load observed at the start of the training phase and the lower bits of the corresponding address. The offset 108 then forms part of a candidate consumer entry to be entered into the candidate producer-consumer relationship 98 according to the previously described logic. At the end of the training phase the candidate producer-consumer relationship may be entered into the producer pattern history table based on a replacement or eviction policy.

The producer tag table 86 stores a plurality of prefetch entries 110 defining in-flight prefetches. Each prefetch entry corresponding to a producer prefetch entry comprises a valid bit, a cache line offset (CLO) of the producer data, a physical address tag of the producer data, a virtual address tag of the producer data, data indicative of a plurality of consumer program counter values and corresponding offsets, and a depth counter. In addition, the producer tag table may store information indicative of consumer prefetch entries. In the case of consumer prefetches, there is no need for the producer tag table 86 to store, in association with the consumer prefetch entry, information indicative of further consumer prefetch entries. Producer prefetch entries 110 in the producer tag tale further comprise a prefetch identifier. A producer prefetch is entered into the producer tag table 86 if there are no existing entries in the producer tag table 86 that have a same address as the producer prefetch to be entered. When the producer prefetch to be entered does not have an address corresponding to an existing entry in the producer tag table the producer prefetch is entered into the table. When the address corresponding to the producer new entry matches a same cache line as an existing entry in the table, the new producer prefetch entry is given the same identifier as the existing entry. If however, the new producer prefetch entry does not match a cache line of an existing entry then the new producer prefetch entry is given a new prefetch identifier.

The sequencer 88 stores a plurality of entries 112 comprising a valid bit, a physical address tag of the producer data and data returned from the producer load. When an entry 112 reaches the head of the sequence buffer stored in the sequencer 88 the sequencer 88 references the information in the producer tag table 86 and the producer pattern history table 82 to generate the consumer prefetches based on the data returned from the producer prefetch. Once the consumer prefetches have been sent the corresponding entry in the producer tag table 86 is invalidated.

The stride prefetcher 90 is used to issue stride prefetches based on a predicted stride length. Because the stride prefetches necessarily correspond to data fetches ahead of the point that they would be fetched in program order, they are inherently timely and can be used to generate producer prefetches for which the data associated with the prefetch will return in time to generate the corresponding consumer prefetches.

Figure 8:
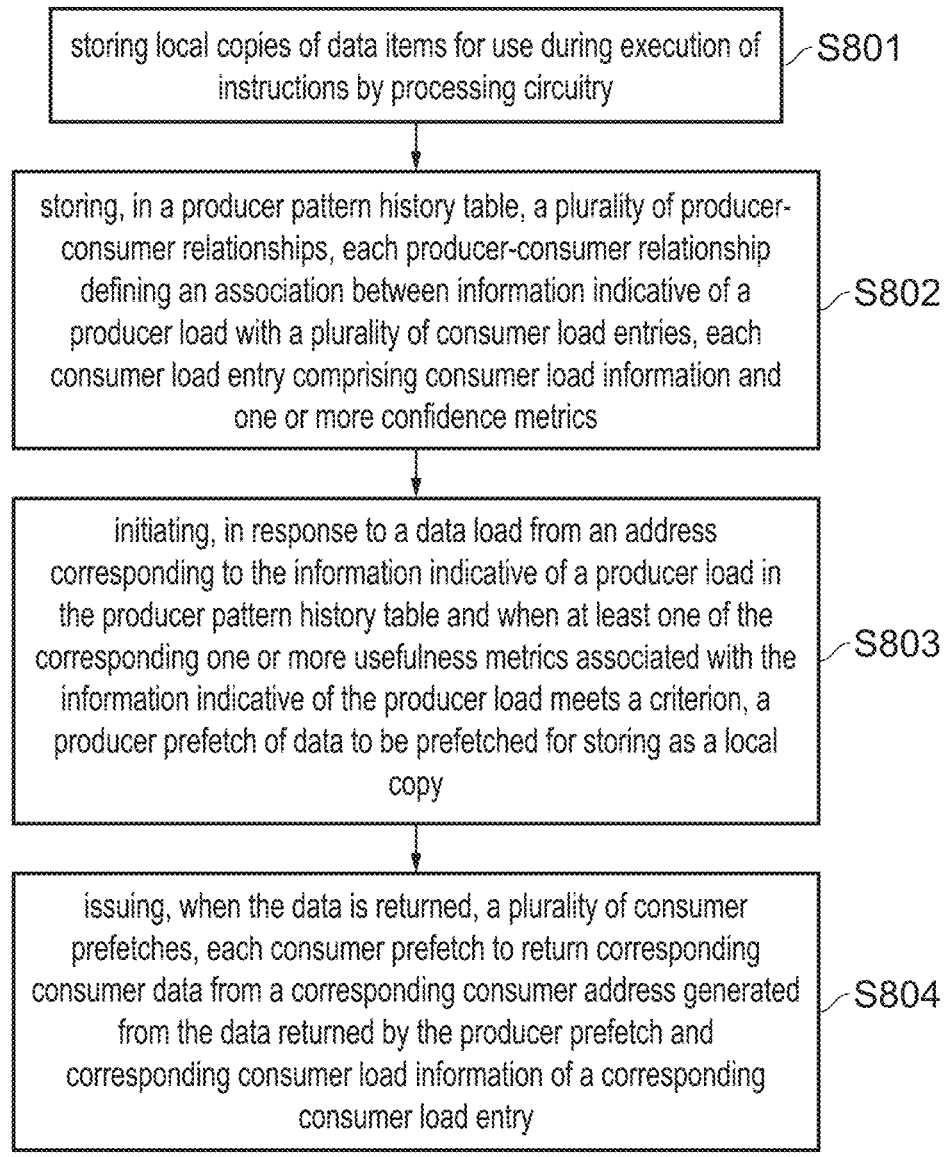
FIG. 8 illustrates a sequence of steps carried out.

FIG. 8 illustrates a sequence of steps carried out by the data processing apparatus in some example embodiments. At step S801 local copies of data items for use during execution of instructions by processing circuitry are stored. At step S802 a plurality of producer-consumer relationships are stored in a producer pattern history table, each producer-consumer relationship defining an association between producer load indicator and a plurality of consumer load entries, each consumer load entry comprising a consumer load indicator and one or more usefulness metrics. At step S803 a producer prefetch of data to be prefetched for storing as a local copy is initiated in response to a data load from an address corresponding to the producer load indicator in the producer pattern history table and when at least one of the corresponding one or more usefulness metrics associated with the producer load indicator meets a criterion. Finally, at step S804, when the data is returned, one or more consumer prefetches are issued, each consumer prefetch to return corresponding consumer data from a corresponding consumer address generated from the data returned by the producer prefetch and a corresponding consumer load indicator of a corresponding consumer load entry.

In brief overall summary data processing apparatuses and methods of processing data are disclosed. The operations comprise: storing copies of data items; and storing, in a producer pattern history table, a plurality of producer-consumer relationships, each defining an association between producer load indicator and a plurality of consumer load entries, each consumer load entry comprising a consumer load indicator and one or more usefulness metrics. Further steps comprise: initiating, in response to a data load from an address corresponding to the producer load indicator in the producer pattern history table and when at least one of the corresponding one or more usefulness meets a criterion, a producer prefetch of data to be prefetched for storing as a local copy; and issuing, when the data is returned, one or more consumer prefetches to return consumer data from a consumer address generated from the data returned by the producer prefetch and a consumer load indicator of a consumer load entry.

Specific Examples of Producer Prefetch Filtering

Figure 9:
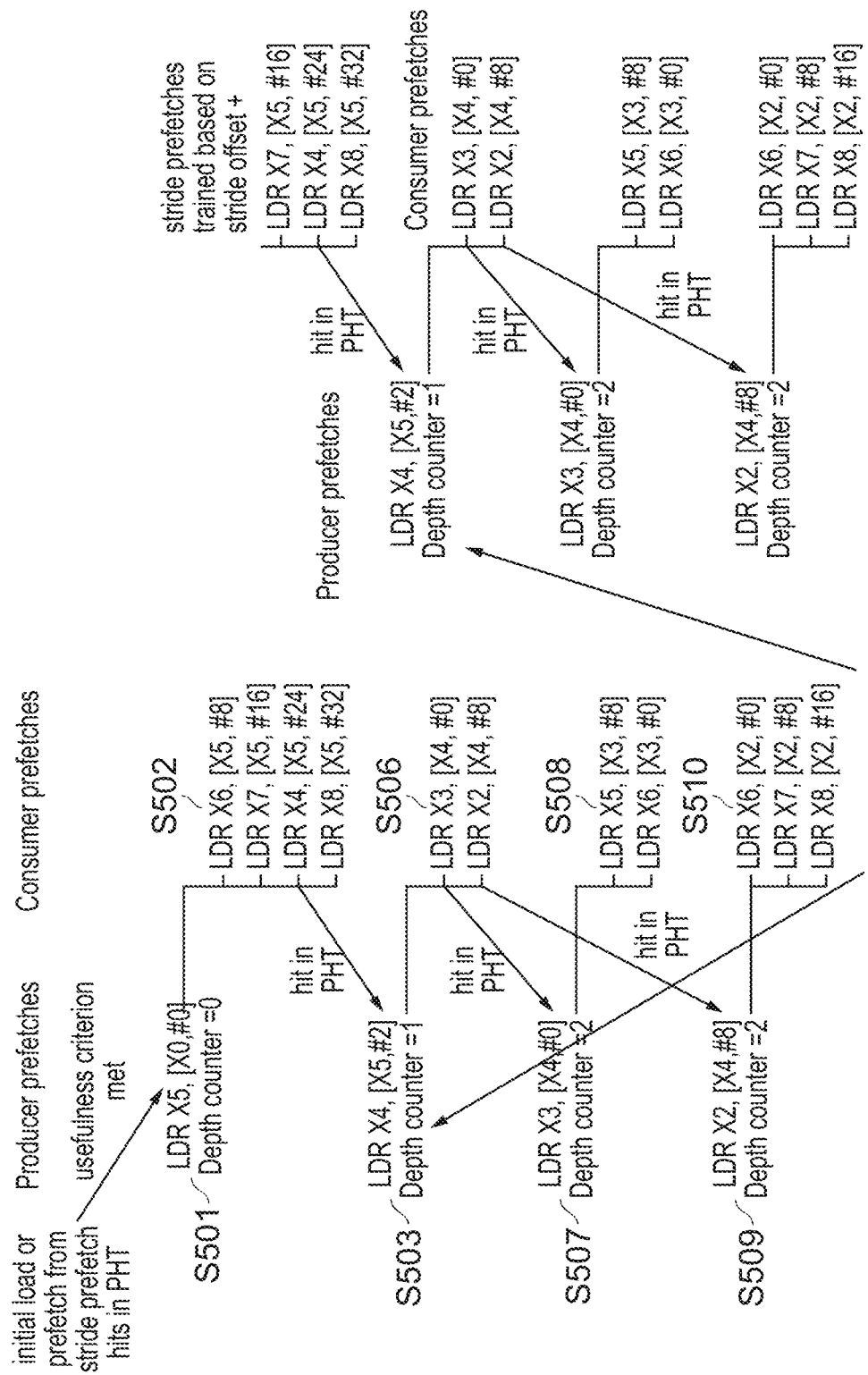
FIG. 9 illustrates how redundant producer prefetches can trigger a corresponding chain of dependence producer/consumer prefetches to be performed more than once.

FIG. 9 illustrates an example of redundant producer prefetches. The prefetch generation circuitry (indirect prefetcher) described in the various examples above can generate a dependent chain of the producer and consumer prefetches as shown in FIG. 5 discussed above and repeated in the left-hand part of FIG. 9. However, as shown in the example of FIG. 3 the apparatus may also have a stride prefetcher 70 for generating prefetch requests based on predicted stride offsets between addresses of successive loads. The stride prefetcher 70 may itself train its predictions based on the addresses of the same loads which are covered by the chain of producer and consumer prefetches. For example, the various consumer prefetches shown at step S502 of FIG. 9 have a constant stride offset of +8, and so after seeing one of these prefetches for the address derived from the operands [X5, #8], the stride prefetcher may generate prefetch requests for the subsequent loads LDR X7, [X5, #16]; LDR X4, [X5, #24] and LDR X8, [X5, #32] which follow the constant stride offset pattern. While this may appear redundant, having the stride prefetcher train on the same load addresses that are also covered in part by the indirect prefetching based on producer-consumer relationships can be useful, because the limited number of consumer prefetches supported for one producer prefetch (four in this example) may not cover all of the loads which use the producer data to derive operands (e.g. there could be further loads which continue the pattern of offsets #8, #16, #24, #32 shown at step S502 of FIGS. 5 and 9 which, in an embodiment limiting to four consumers per producer, would not be able to be anticipated by the indirect prefetching using producer/consumer relationships, but could be predicted by the stride prefetcher 70). On other occasions, the consumer loads may not have a constant stride relationship and so on that occasion the load address patterns may be better predicted by the indirect prefetching rather than the stride prefetcher.

Hence, there can be some redundancy between the prefetches initiated by the indirect prefetch (prefetch generation circuitry) and the stride prefetcher. In the example of FIG. 9, as one of the stride prefetches for LDR X4, [X5. #24] hits in the pattern history table, the producer prefetch corresponding to load LDR X4, [X5, #2] initiated at step S503 based on a consumer prefetch is redundantly initiated again in response to the stride prefetch (or alternatively, the stride prefetch may have been the first to trigger that producer prefetch, followed by the redundant consumer-prefetch-triggered producer prefetch). This causes the subsequent chain of dependent producer/consumer prefetches to be performed more than once. This wastes bandwidth in the cache and memory and resources within the prefetcher and can cause loss of performance due to other more useful prefetches not being able to be issued in a timely fashion due to limited prefetch resource or limited cache/memory bandwidth.

Figure 10:
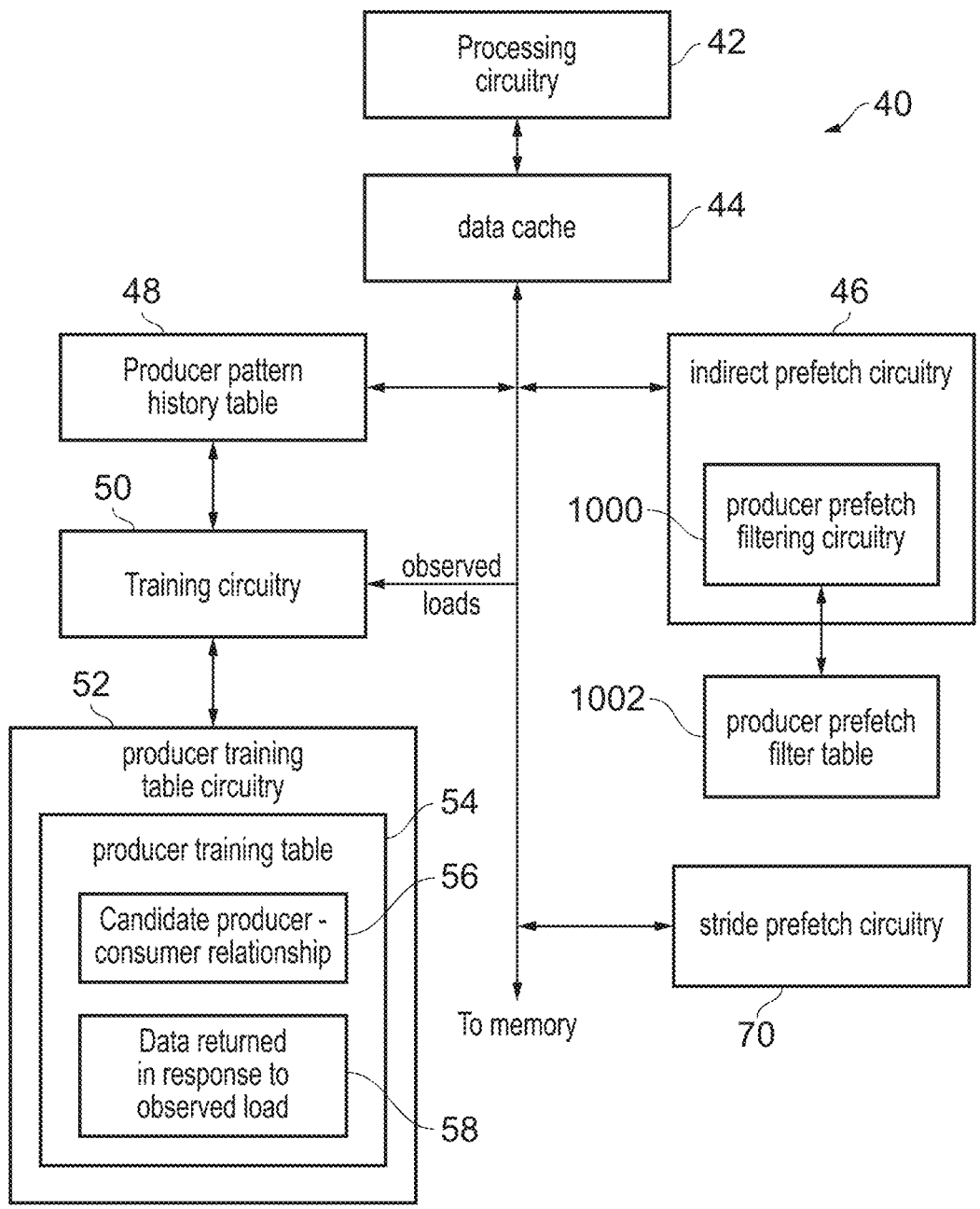
FIG. 10 illustrates a data processing apparatus comprising producer prefetch filtering circuitry.

FIG. 10 illustrates an example of an apparatus in which the indirect prefetch circuitry 46 (corresponding to any of the examples of the prefetch generation circuitry mentioned earlier) is provided with producer prefetch filtering circuitry 1000 which maintains a producer prefetch filter table 1002 to track addresses of previously initiated producer prefetches, so that when requesting initiation of a subsequent producer prefetch the address of that producer prefetch can be looked up in the table 1002 and the producer prefetch can be suppressed if the address hits in the table 1002.

Most of the components of the apparatus shown in FIG. 10 are the same as the correspondingly numbered features shown in FIG. 2 discussed earlier. In addition, the apparatus has the stride prefetch circuitry 70 discussed above in the example of FIG. 3 and the producer prefetch filtering circuitry 1000 and producer prefetch filter table 1002 mentioned above. It will be appreciated that FIG. 10 is not exhaustive, and any of the features mentioned for the earlier examples of FIGS. 1 to 8 can also be included in the apparatus of FIG. 10.

Figure 11:
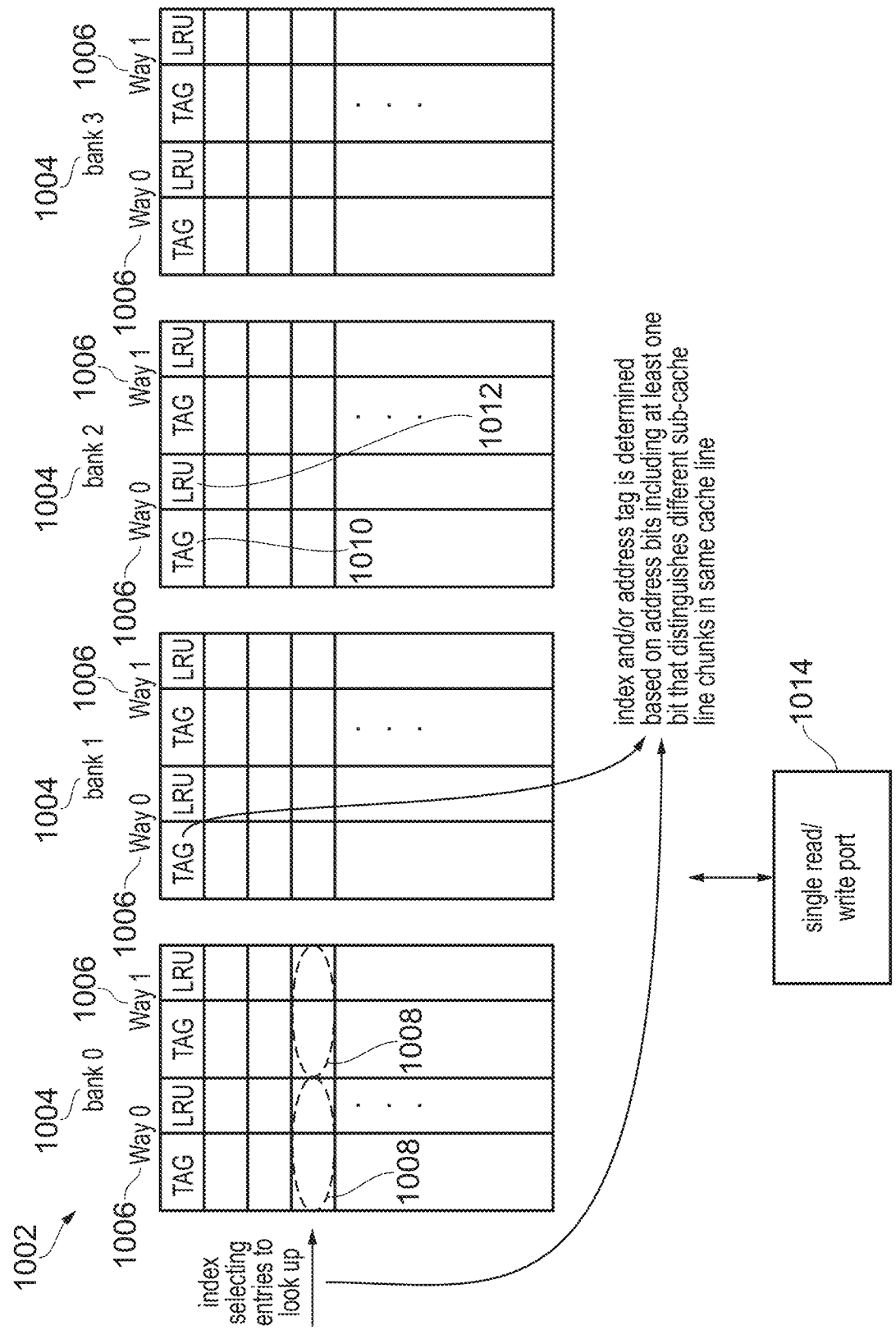
FIG. 11 illustrates an example of a producer prefetch filter table.

FIG. 11 illustrates an example of the producer prefetch filter table 1002 in more detail. The producer prefetch filter table 1002 is implemented as a cache-like structure comprising a number of banks 1004 of storage circuitry, each bank providing a certain number of producer filter entries 1008 logically arranged as two ways 1006 of a set-associative cache structure (it will be appreciated that the physical arrangement can be different). The two-way set-associative structure means that, for any given address, that address may map to one of two entries in the table 1002, one in each way. The set of entries 1008 that corresponds to a particular address is identified based on an index value obtained by extracting a portion of bits from the address or applying a hash function to the address. Each entry 1008 stores a tag value 1010 (for distinguishing addresses mapping to the same index value) which is derived from the address allocated to that entry using a hash function applied to a portion of bits of the address. At least one of the index value and the tag value is derived using at least one bit of the address that distinguishes different sub-cache line sized chunks of data within the same cache line. For example, with 64-byte cache lines, the index and/or tag may be derived using bits [5:3] of the address (numbered assuming the least significant bit of the address is bit 0), in an example where the chunk size is 8 bytes so that the lower three bits of the address can be ignored as they refer to bytes within the same chunk while the next three bits of the address can be considered to distinguish different chunks within the same cache line (the index/tag calculation function may also consider other bits of the address at more significant bit positions than bit [5], to allow addresses in different cache lines to miss against one another as they map to different index/tag combinations).

Hence, by considering at least one sub-cache-line bit that distinguishes addresses mapping to different chunks of data within one cache line, this means that a look up for an address misses against an entry allocated for an address corresponding to a different chunk of data within the same cache line. This may be counter-intuitive as normally prefetch requests hitting on the same cache line would appear to be redundant. However, as producer prefetches for different chunks of data within the same cache line will return different producer data which can be used to generate separate sets of consumer prefetches, it can be useful for the producer prefetch filter table 1002 to track the addresses using tags 1010 set based on sub-cache-line granularity, such as using a chunk size of 8 bytes (64 bits, which can be useful for 64-bit instruction set architectures for example). Each entry 1008 also includes replacement policy information 1012 (in this example, least recently used (LRU) bits indicating which of the entries 1008 in a set is the least recently used), which are used to select a victim entry to be replaced when a new entry is to be allocated to the table 1002 and there is no invalid entry available. Although not shown in FIG. 11 for conciseness, each entry can also include a "valid" bit which indicates whether the entry is valid or invalid.

In the example of FIG. 11, the producer prefetch filter table 1002 is implemented as a 2-way, 4-bank structure using single ported RAM, so there is only one read/write port 1014. This means that it is not possible to perform both a read and a write for entries in the same bank 1004 within the same processing cycle. It will be appreciated that other examples could implement a different associativity (greater or fewer than two ways 1006) or could implement different numbers of banks 1004, or could implement more than one read/write port 1014.

Figure 12:
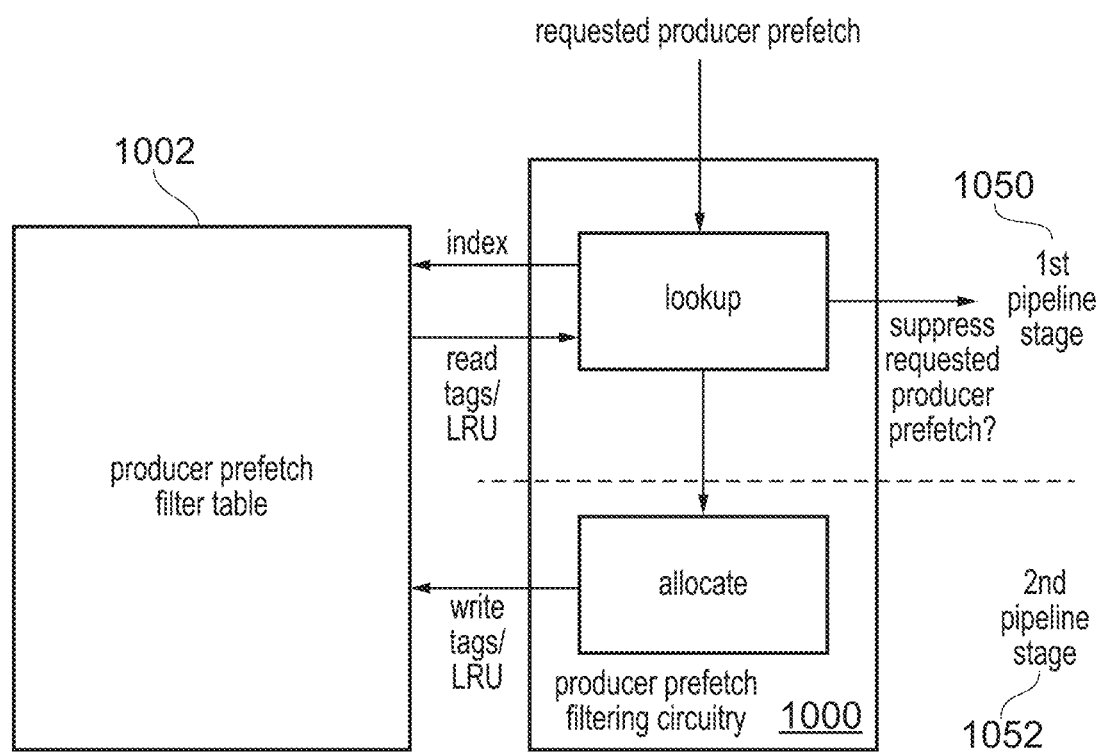
FIG. 12 illustrates producer prefetch filter table lookup and allocation.

FIG. 12 illustrates the producer prefetch filtering circuitry 1000 in more detail. The producer prefetch filtering circuitry 1000 has a first pipeline stage 1050 for looking up the producer prefetch filter table 1002 and a second pipeline stage 1052 for controlling allocation into the producer prefetch filter table 1002. The first and second pipeline stages 1050, 1052 operate in parallel with the first pipeline stage 1050 performing a lookup for a first requested producer prefetch in parallel with the second pipeline stage 1052 performing allocation for a second requested producer prefetch.

At the first pipeline stage 1050, the producer prefetch filtering circuitry 1000 calculates the index corresponding to the requested producer address of the first requested producer prefetch being processed at the first pipeline stage 1050, and reads the tags 1010 and replacement policy (LRU) bits 1012 of the entries 1008 in the set corresponding to the calculated index. The producer prefetch filtering circuitry 1000 compares the tags 1010 of those entries 1008 against a tag derived from the requested producer address of the first requested producer prefetch and determines whether the tag corresponding to the requested producer address matches any of the read tags. Either the index calculation, or the tag calculation, or both depends on at least one sub-cache-line bit that distinguishes addresses mapping to different chunks of data within one cache line. If one of the read tags from the indexed entries matches the tag corresponding the requested producer address, then a hit in the table 1002 is detected, and otherwise a miss is detected. If a hit is detected then the initiation of the first requested producer prefetch is suppressed so that it will not be issued to the cache 44. If a miss is detected then the requested producer prefetch is allowed to be initiated.

The tags and replacement policy bits read out at the first pipeline stage are provided to the second pipeline stage for use in allocation decisions. The first requested producer prefetch processed in the first pipeline stage 1050 becomes the second requested producer prefetch processed at the second pipeline stage 1052 in the following cycle.

At the second pipeline stage 1052, if the second requested producer prefetch is triggered by a prefetch request generated by the stride prefetcher 70 or is a consumer prefetch on a dependency chain originally triggered by a stride producer prefetch, and there was no hit detected in the filter table 1002 at the first pipeline stage 1050 in the previous cycle, then a new entry for the address of the second requested producer prefetch is allocated into the table 1002. A victim entry to be replaced with the new entry is selected based on the replacement policy bits 1012 of the set of entries 1008 read out in the first pipeline stage. For example, for LRU policy the least recently allocated entry is replaced. The calculated tag used for the lookup comparisons in the first pipeline stage is written into the selected victim entry and the replacement policy bits for the entire set of entries 1008 are updated to reflect the new allocation (e.g. for a 2-way structure, now the other entry not selected as the victim will become the least recently used, or for a structure with more than 2 ways the LRU bits are updated to reflect the sequence in which entries were allocated). Other replacement policies could also be used.

On the other hand, if the second requested producer prefetch is triggered by a demand load issued by the processing circuitry 42 to request data from the data cache 44 (when the address of the demand load hits in the pattern history table 48), or by a consumer prefetch on a dependency chain originally triggered by a demand producer prefetch, then the allocation is suppressed and no allocation into the producer prefetch filter table 1002 is performed in that cycle. This is because some redundancy in generating demand-triggered producer prefetches is useful to ensure timely prefetching ahead of the point reached by the stream of demand loads. For example, in a linked-list traversal, a demand to node 0 can trigger dependent producer/consumer prefetches down the chain sending producer prefetches for node 1, node 2, node 3, up to some limit of recursion (e.g. node 4 could be where the limit is reached). If the demand triggered prefetches were allocated to the producer prefetch filter table 1002 then no further consumer prefetches could be issued by the indirect prefetch circuitry 46 until the demand stream has reached node 5, at which point there may be a cache miss in the data cache 44 because the corresponding data for node 5 has not yet been prefetched. In contrast, if some redundancy in dealing with demand-triggered producer prefetches is supported then when the demand load for node 1 of the linked list is processed, this may then generate a further set of dependent producer/ consumer prefetches down the chain reaching node 5 this time, and so on so that the prefetches may stay a certain number of nodes ahead of the point reached by the demands sequence of loads to ensure that there is timely prefetching of the corresponding data into the cache before the corresponding demand load is processed. Hence, it can be useful to prevent demand triggered prefetches (and consumer prefetches dependent on a demand triggered prefetch) from allocating entries into the producer prefetch filter table 1002.

As in the example of FIG. 11 the table 1002 is implemented as single-ported RAM, bank conflicts can arise between the reading prefetch being processed in the first pipeline stage 1050 and the writing prefetch being processed in the second pipeline stage 1052. While it is possible for the second pipeline stage 1052 to write to an entry in a different bank from the entry being read in the first pipeline stage 1050, due to the setup operations needed to prepare the storage circuitry to access another entry in the same bank, a read and write of two entries in the same bank may not be possible in the same cycle. If such a bank conflict arises, then the read that would otherwise be carried out in the first pipeline stage 1050 is omitted and so the first requested producer prefetch being processed in that pipeline stage is allowed to be initiated regardless of whether it would have hit against an entry in the producer prefetch filter table 1002. The write which caused the conflict is still allowed to allocate a new entry in the second pipeline stage 1052. To reduce the likelihood of bank conflicts, it can be useful to select which bank is accessed based on a subset of bits which are close to the least significant end of the address, making it more likely that, given temporal and spatial locality of memory accesses, a number of addresses accessed within a short period are distributed across the different banks. Nevertheless, it will be appreciated that the particular approach for mapping addresses onto the different banks may vary from one implementation to another.

Figure 13:
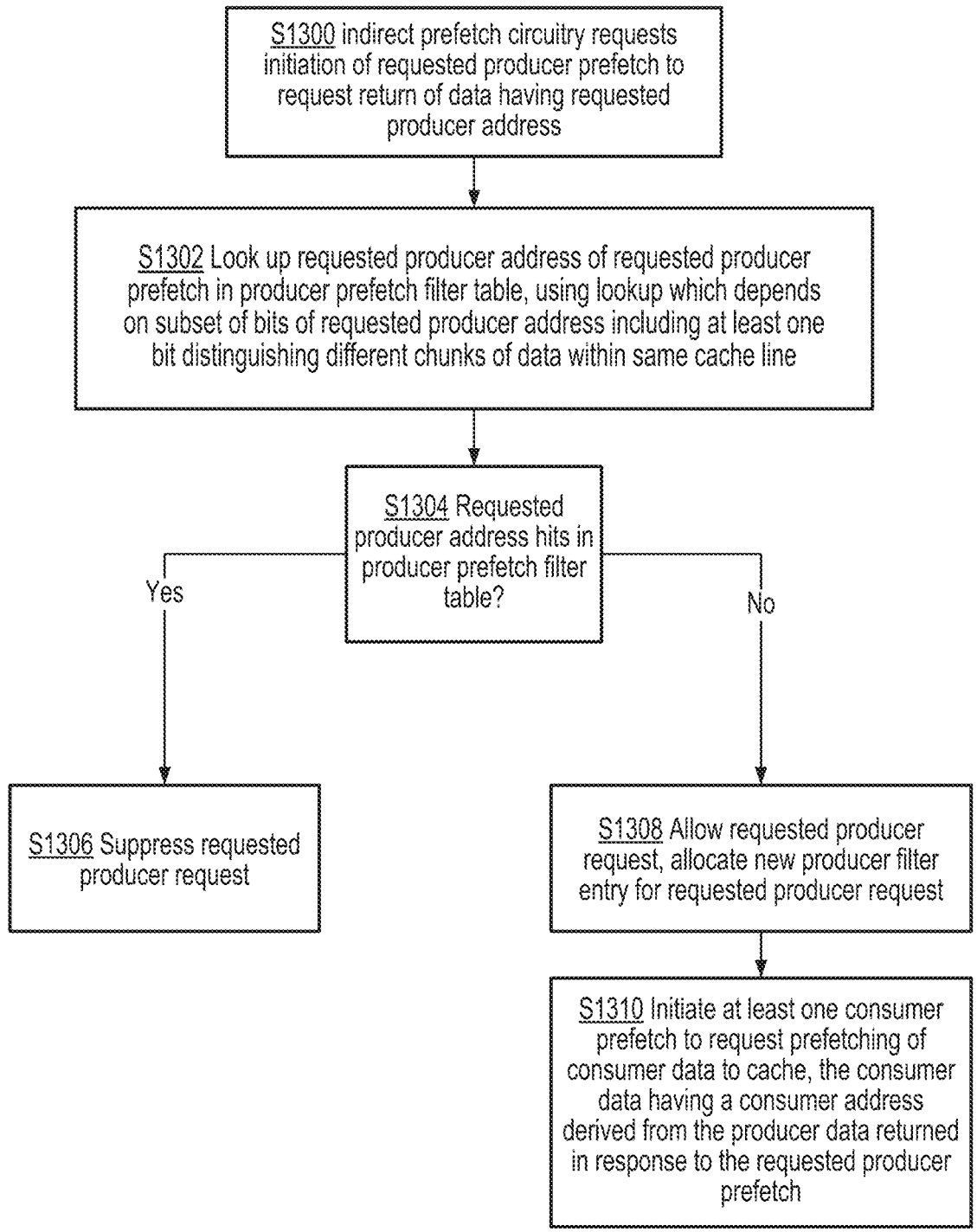
FIG. 13 illustrates a method for filtering producer prefetches generated by indirect prefetch circuitry.

FIG. 13 is a flow diagram illustrating a method of filtering producer prefetches. At step S1300 the indirect prefetch circuitry 46 requests initiation of a requested producer prefetch to request return of data having a requested producer address. For example, the indirect prefetch circuitry 46 may allocate the requested producer prefetch into a queue of requested producer prefetches awaiting initiation.

At step S1302 the producer prefetch filtering circuitry 1000 (for example, when the requested producer prefetch reaches a head of the queue) looks up the requested producer address of the requested producer prefetch in the producer prefetch filter table 1002, using a lookup scheme which depends on a subset of bits of the requested producer address including at least one bit distinguishing different chunks of data within the same cache line. For example, the lookup scheme may detect a hit against a given producer filter entry 1008 allocated for a given previous producer prefetch address when the requested producer address and the given previous producer prefetch address corresponding to that entry correspond to the same chunk of data in the same cache line, and detect a miss against the given entry when the requested producer address and the given previous producer prefetch address correspond to different chunks of the same cache line (and also detect a miss when the requested producer address and the given previous producer address correspond to different cache lines, at least when there is no aliasing of the requested producer address and the given previous producer address onto the same index/tag pair which might occasionally occur to give a false hit, if a reduced size hash is used which permits aliasing for some pairs of addresses even if not mapping to the same chunk of the same cache line). At step S1304 the producer prefetch filtering circuitry 1000 determines whether the requested producer address hits in the producer prefetch filter table. If so then at step S1306 the requested producer request is suppressed from being initiated and so is discarded from the queue without being processed further.

If a miss (no hit) is detected, then at step S1308 the requested producer request is allowed to be initiated and a new producer filter entry can be allocated for the requested producer request, so that later producer prefetches can be suppressed if they are found to be redundant against the requested producer request being initiated now. Following initiation of the requested producer request, the producer data requested to be prefetched is returned to the indirect prefetch circuitry 46, which at step S1310 initiates at least one consumer prefetch to request prefetching of consumer data to the cache 44, where the address of the consumer data is derived from the producer data returned by the requested producer prefetch. The relations used to derive the consumer address from the producer data for each consumer prefetch are determined based on the entry of the pattern history table 48 that corresponds to the requested producer request.

Figure 14:
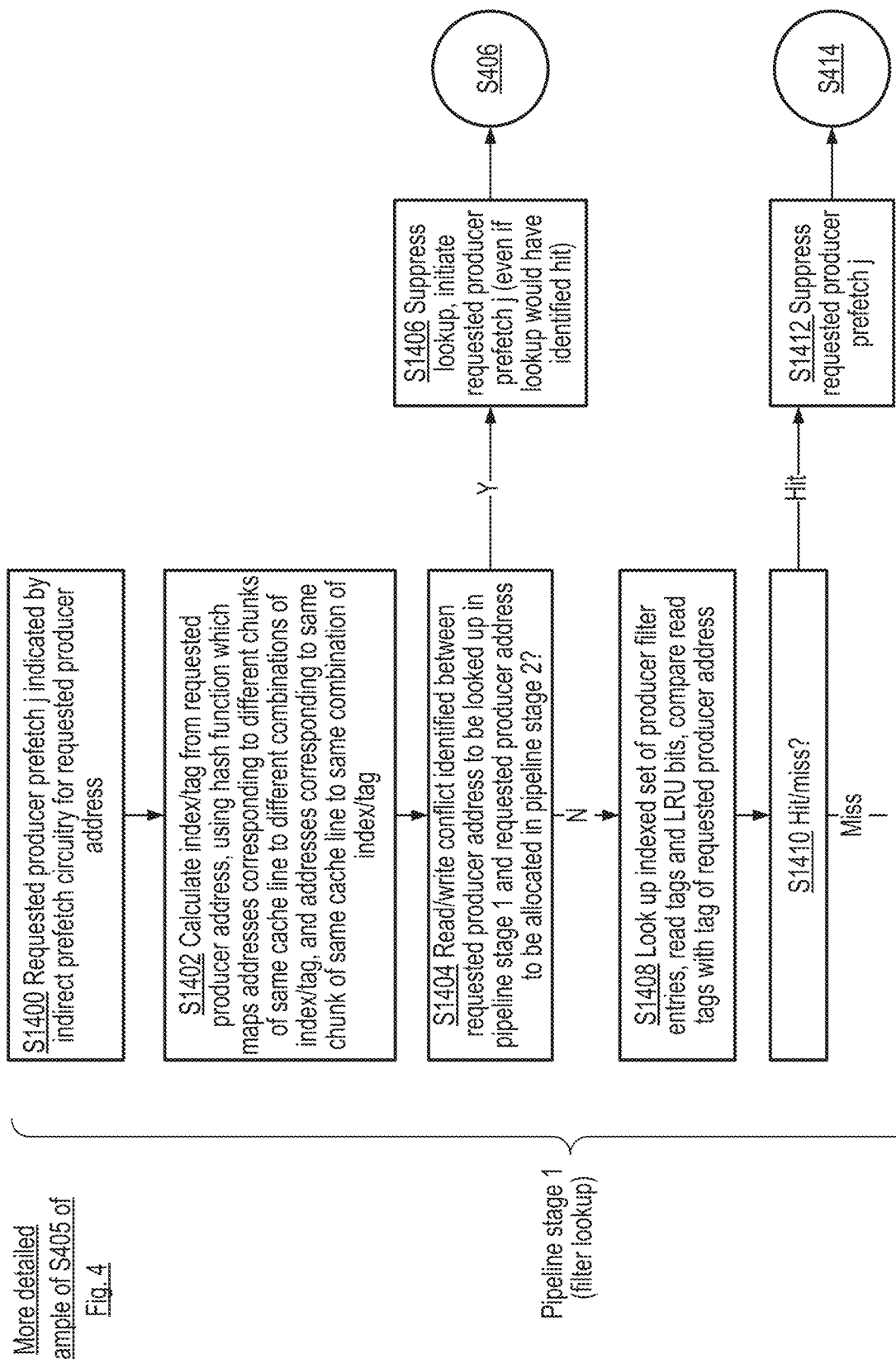
FIG. 14 illustrates a more detailed example of controlling initialisation of producer prefetches.

As already described earlier, FIG. 4 illustrates a more detailed method for controlling the initiation of producer and consumer prefetches. This method can also be used by the indirect prefetch circuitry 46 in the example of FIG. 10. FIG. 14 shows more detail for step S405 of FIG. 4, but updated to support producer prefetch filtering as in the example of FIG. 10. Steps S1400 to S1414 are performed at the first pipeline stage 1050 and steps S1416 to S1422 are performed at the second pipeline stage 1052 of the producer prefetch filtering circuitry 1000.

At step S1400 of FIG. 14, information on the next producer prefetch j to be processed is obtained by the producer prefetch filtering circuitry 1000. For example, this information can be obtained from a prefetch queue maintained by the indirect prefetch circuitry 46. The information about the next producer prefetch j can specify the requested producer address of the producer data to be returned to the indirect prefetcher 46, as well as an indication of the type of load that triggered the producer prefetch (e.g. a demand load or a prefetch request issued by the stride prefetcher 70).

At step S1402 the producer prefetch filtering circuitry 1000 calculates the index value and the tag from the requested producer address, using a hash function which maps addresses corresponding to different chunks of same cache line to different combinations of index/tag, and addresses corresponding to the same chunk of the same cache line to the same combination of index/tag. Addresses corresponding to different cache lines may normally map to different combinations of index/tag, although it is possible that, if the combination of index/tag has fewer bits than the originally address, the index/tag combination may support some aliasing so that there are some combinations of addresses mapping to different cache lines which share the same index/tag combination.

At step S1404, the producer prefetch filtering circuitry 1000 checks whether there is a read/write conflict identified between the requested producer address to be looked up in the first pipeline stage 1050 and the requested producer address to be allocated to the filter table 1002 in the second pipeline stage 1052. For example, this conflict may be detected if the respective producer addresses for the requests processed in the two pipeline stages 1050, 1052 both map to entries in the same bank. The first pipeline stage 1050 may have a register for retaining information from the previous processing cycle, which allows the conflict to be detected (e.g. the retained information could be the requested producer address processed in the previous cycle, or the index value determined in the previous cycle, or an indication of which bank 1004 was accessed in the previous cycle). If the read/write (bank) conflict is detected, then at step S1406 the lookup to be performed for the requested producer prefetch j being processed at the first pipeline stage 1050 is suppressed and the producer prefetch j is allowed to be initiated, even if it would have hit in the table 1002 if a lookup had been performed. The method then proceeds to step S406 of FIG. 4 to await the producer data and generate subsequent consumer prefetches.

If no read/write conflict is identified at step S1404 then at step S1408 the producer prefetch filtering circuitry 1000 looks up the indexed set of producer filter entries 1008 identified by the index value calculated at step S1408, reads the tags 1010 and LRU bits 1012 of those entries, and compares the read tags with the tag derived from the requested producer address. At step S1410 the producer prefetch filtering circuitry 1000 detects whether a hit or miss is detected, based on whether one of the read tags matches the tag derived from the requested producer address. If a hit is detected then at step S1412 the requested producer prefetch j is suppressed and the method continues to step S414 of FIG. 4. Hence, steps S406 to S410 of FIG. 4 are skipped in the case when the producer prefetch j are suppressed, as there is then no need to process any corresponding consumer prefetches (note, if one of those consumer prefetches would itself have been a producer prefetch, this will also suppress further producer/consumer prefetches in a chain of dependency). For example, all of the chain of producer/prefetches shown redundantly in FIG. 9 can be suppressed as a result of cancelling the redundant producer prefetch at S503.

If a miss is detected at step S1410 of FIG. 14, then at step S1414 the requested producer prefetch j is initiated and the method continues to step S406 of FIG. 4 to await return of producer data and initiation of dependent consumer prefetches, as in this case no redundancy has been detected.

Meanwhile, the requested producer prefetch j proceeds to the second pipeline stage 1052, and at step S1416, the producer prefetch filtering circuitry 1000 determines whether the requested producer prefetch is a demand-triggered producer prefetch or a consumer-prefetch-triggered producer prefetch which is in a chain of dependent producer/consumer prefetches where the first producer prefetch in the chain was a demand-triggered producer prefetch. If so then at step S1418 the allocation of a new entry for the requested producer prefetch is suppressed and again the method continues to step S406 of FIG. 4.

Otherwise, the method proceeds to step S1420. For example, step S1420 is performed if the requested producer prefetch j is a stride-triggered producer prefetch triggered based on a prediction made by the stride prefetch circuitry 70, or a consumer-prefetch-triggered producer prefetch which is in a chain of dependent producer/consumer prefetches where the first producer prefetch in the chain was a stride-triggered producer prefetch. At step S1420 a replacement entry is selected from among the set of entries 1008 identified by the calculated index for the requested producer address. If an invalid entry is available in that set, then the invalid entry is selected as the replacement entry. Otherwise, the least recently used entry in the indexed set of entries 1008 is identified using the LRU bits 1012 read out at step S1408 and the least recently used entry is selected as the replacement entry. At step S1422 the tag associated with the requested producer address for requested producer prefetch j is written to the tag field of the selected replacement entry, and also the LRU bits 1012 of the entries corresponding to the index value are updated to reflect the new allocation. The write operations for updating the tag 1010 in the replacement entry and the LRU bits 1012 can be performed as a single write request. Again, the method continues to step S406 of FIG. 4.

In summary, by filtering out redundant producer prefetches to the same chunk of the same cache line, but allowing producer prefetches to proceed for different chunks of data in the same cache line or different cache lines, performance can be improved by allowing limited prefetch/cache/memory bandwidth to be used for more useful requests.

Code for Fabrication of Apparatus

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   indirect prefetch circuitry to prefetch data to a cache, wherein the indirect prefetch circuitry is configured to initiate a producer prefetch to request return of producer data having a producer address and to initiate at least one consumer prefetch to request prefetching of consumer data to the cache, the consumer data having a consumer address derived from the producer data returned in response to the producer prefetch;
   a producer prefetch filter table to store producer filter entries indicative of previous producer addresses of previous producer prefetches previously initiated by the indirect prefetch circuitry; and
   producer prefetch filtering circuitry to suppress initiation of a requested producer prefetch requested to be initiated by the indirect prefetch circuitry for producer data having a requested producer address, in response to determining in a lookup of the producer prefetch filter table that the requested producer address hits against one of the producer filter entries of the producer prefetch filter table, in which:
   the lookup of the producer prefetch filter table for the requested producer address depends on a subset of bits of the requested producer address including at least one bit which distinguishes different chunks of data within a same cache line.

2. The apparatus according to claim 1, in which the producer prefetch filtering circuitry is configured to determine, depending on said at least one bit of the requested producer address which distinguishes different chunks of data within the same cache line, an index value used by the producer prefetch filtering circuitry to select one or more producer filter entries to be looked up in the lookup of the producer prefetch filter table for the requested producer address.

3. The apparatus according to claim 1, in which the producer prefetch filtering circuitry is configured to determine, depending on said at least one bit of the requested producer address which distinguishes different chunks of data within the same cache line, a tag value to be compared with a tag value stored in one or more producer filter entries to be looked up in the lookup of the producer prefetch filter table for the requested producer address.

4. The apparatus according to claim 1, in which said different chunks of data within the same cache line comprise chunks of a given chunk size smaller than a cache line size;
   where said given chunk size is equal to, or smaller than, an address size specified by an instruction set architecture supported by the apparatus.

5. The apparatus according to claim 1, comprising a producer pattern history table to store a plurality of producer-consumer relationships, each producer-consumer relationship defining a producer load indicator and at least one consumer load indicator; in which:
   in response to detecting a producer load corresponding to the producer load indicator of a given producer-consumer relationship indicated in the producer pattern history table, the indirect prefetch circuitry is configured to request initiation of a producer prefetch corresponding to the producer load indicator and at least one consumer prefetch corresponding to the at least one consumer load indicator of the given producer-consumer relationship.

6. The apparatus according to claim 5, in which in response to detecting that a consumer prefetch corresponds to the producer load indicator of a further producer-consumer relationship indicated in the producer pattern history table, the indirect prefetch circuitry is configured to request initiation of a further producer prefetch and at least one further consumer prefetch corresponding to the producer load indicator and the at least one consumer load indicator defined in the further producer-consumer relationship.

7. The apparatus according to claim 6, in which the producer load is one of:
   a demand-triggered load requesting loading of data to registers of processing circuitry;
   a prefetch request issued by further prefetch circuitry to prefetch data to the cache according to a prefetching scheme different from a prefetching scheme used by the indirect prefetch circuitry; and a consumer prefetch issued by the indirect prefetch circuitry which corresponds to the producer load indicator of a further producer-consumer relationship stored in the pattern history table.

8. The apparatus according to claim 1, in which the producer prefetch filtering circuitry is configured to allocate to the producer prefetch filter table a new producer filter entry corresponding to the requested producer address of a requested producer prefetch which misses in the producer prefetch filter table.

9. The apparatus according to claim 8, in which when the new producer filter entry is to be allocated to the producer prefetch filter table and there is no invalid producer filter entry able to be allocated for the new producer filter entry, the producer prefetch filtering circuitry is configured to select a valid producer filter entry to be replaced with the new producer filter entry according to a least-recently-used replacement policy.

10. The apparatus according to claim 8, comprising processing circuitry to issue demand-triggered load requests to request loading of data to registers of the processing circuitry; in which:
the producer prefetch filtering circuitry is configured to suppress allocation of the new producer filter entry corresponding to the requested producer address when the requested producer prefetch which misses in the producer prefetch filter table is one of:
a demand-triggered producer prefetch triggered by the indirect prefetch circuitry in response to a demand-triggered load request issued by the processing circuitry; and
a consumer-prefetch-triggered producer prefetch triggered by a consumer prefetch initiated by the indirect prefetch circuitry in a chain of dependent producer/consumer prefetches, where a first producer prefetch in the chain of dependent producer/consumer prefetches was a demand-triggered producer prefetch.

11. The apparatus according to claim 8, comprising further prefetch circuitry to prefetch data to the cache according to a prefetching scheme different from a prefetching scheme used by the indirect prefetch circuitry; in which:
the producer prefetch filtering circuitry is configured to allow allocation of the new producer filter entry corresponding to the requested producer address when the requested producer prefetch which misses in the producer prefetch filter table is one of:
a producer prefetch triggered by a prefetch request issued by the further prefetch circuitry; and
a consumer-prefetch-triggered producer prefetch triggered by a consumer prefetch initiated by the indirect prefetch circuitry in a chain of dependent producer/consumer prefetches, where a first producer prefetch in the chain of dependent prefetches was triggered by a prefetch request issued by the further prefetch circuitry.

12. The apparatus according to claim 11, in which the further prefetch circuitry comprises stride prefetch circuitry to predict addresses of data to be prefetched based on a stride offset observed between addresses of loads.

13. The apparatus according to claim 8, in which the producer prefetch filtering circuitry comprises a first pipeline stage to perform the lookup of the producer prefetch filter table and a second pipeline stage to perform allocation into the producer prefetch filter table, where the first pipeline stage is configured to perform the lookup for a first requested producer address of a first requested producer prefetch in a same cycle as the second pipeline stage performs the allocation of the new producer filter entry corresponding to a second requested producer address of a second requested producer prefetch.

14. The apparatus according to claim 13, in which in response to detecting, in a given cycle, a read/write conflict indicative of a first producer filter entry corresponding to the first requested producer address being incapable of being read by the first pipeline stage in a same cycle as a second producer filter entry corresponding to the second producer filter entry is written in the second pipeline stage, the producer prefetch filtering circuitry is configured to suppress the lookup for the first requested producer address and allow the first requested producer prefetch to be initiated regardless of whether the first requested producer address would have hit in the producer prefetch filter table if a lookup had been performed.

15. The apparatus according to claim 14, in which when the read/write conflict is detected in the given cycle, the producer prefetch filtering circuitry is configured to allow the allocation of the new producer filter entry corresponding to the second requested producer address to be performed in the given cycle.

16. The apparatus according to claim 14, in which the producer prefetch filter table comprises a plurality of banks of storage circuitry, and the producer prefetch filtering circuitry is configured to detect the read/write conflict when the first producer filter entry and the second producer filter entry are entries in the same bank of storage circuitry.

17. A method comprising:
requesting initiation of a requested producer prefetch to request return of producer data having a requested producer address, using indirect prefetch circuitry configured to initiate at least one consumer prefetch to request prefetching of consumer data to a cache, the consumer data having a consumer address derived from the producer data returned in response to the producer prefetch;
performing a lookup of the requested producer address in a producer prefetch filter table storing producer filter entries indicative of previous producer addresses of previous producer prefetches previously initiated by indirect prefetch circuitry, to determine whether the requested producer address hits or misses in the producer prefetch filter table; and
suppressing initiation of the requested producer prefetch in response to determining that the requested producer address hits in the producer prefetch filter table; in which:
the lookup of the producer prefetch filter table for the requested producer address depends on a subset of bits of the requested producer address including at least one bit which distinguishes different chunks of data within a same cache line.

18. A non-transitory computer-readable medium to store computer-readable code for fabrication of an apparatus comprising:
indirect prefetch circuitry to prefetch data to a cache, wherein the indirect prefetch circuitry is configured to initiate a producer prefetch to request return of producer data having a producer address and to initiate at least one consumer prefetch to request prefetching of consumer data to the cache, the consumer data having a consumer address derived from the producer data returned in response to the producer prefetch;
a producer prefetch filter table to store producer filter entries indicative of previous producer addresses of previous producer prefetches previously initiated by the indirect prefetch circuitry; and producer prefetch filtering circuitry to suppress initiation of a requested producer prefetch requested to be initiated by the indirect prefetch circuitry for producer data having a requested producer address, in response to determining in a lookup of the producer prefetch filter table that the requested producer address hits against one of the producer filter entries of the producer prefetch filter table, in which:

the lookup of the producer prefetch filter table for the requested producer address depends on a subset of bits of the requested producer address including at least one bit which distinguishes different chunks of data within a same cache line.

* * * * *